(12) United States Patent
Sullivan et al.

(10) Patent No.: US 9,592,425 B2
(45) Date of Patent: Mar. 14, 2017

(54) MULTI-LAYER CORE GOLF BALL

(71) Applicant: Acushnet Company, Fairhaven, MA (US)

(72) Inventors: Michael J. Sullivan, Old Lyme, CT (US); Brian Comeau, Berkley, MA (US); Douglas S. Goguen, New Beford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/527,835

(22) Filed: Oct. 30, 2014

(65) Prior Publication Data

US 2015/0057105 A1   Feb. 26, 2015

Related U.S. Application Data

(63) Continuation-in-part of application No. 14/248,618, filed on Apr. 9, 2014, and a continuation-in-part of
(Continued)

(51) Int. Cl.
*A63B 37/00* (2006.01)
*C08L 13/00* (2006.01)
(Continued)

(52) U.S. Cl.
CPC ...... *A63B 37/0092* (2013.01); *A63B 37/0039* (2013.01); *A63B 37/0043* (2013.01);
(Continued)

(58) Field of Classification Search
CPC .................. A63B 37/0062; A63B 37/0063
(Continued)

(56) References Cited

U.S. PATENT DOCUMENTS

| 4,650,193 A | 3/1987 | Molitor et al. |
| 4,732,944 A | 3/1988 | Smith, Jr. |

(Continued)

FOREIGN PATENT DOCUMENTS

| WO | WO0023519 | 4/2000 |
| WO | WO0129129 | 4/2001 |

OTHER PUBLICATIONS

ChemSystems Report Abstract Styrene Block Copolymers; Feb. 2010; pp. 1-5.
(Continued)

*Primary Examiner* — Raeann Gorden
(74) *Attorney, Agent, or Firm* — Margaret C. Barker

(57) ABSTRACT

A golf ball comprising a core and a cover, the core consisting of: a solid inner core layer formed from a first unfoamed thermoplastic composition $TP_1$ and having a diameter of 1.10 inch or less and a center Shore C hardness ($H_{center}$) of 50 or less, one or more optional intermediate core layers, and an outer core layer formed from a second thermoplastic composition $TP_2$ comprising at least one transparent or plasticized polyamide and having a thickness of 0.200 inches or greater and an outer surface Shore D hardness ($H_{outer\ surface}$) of 55 or greater, wherein $H_{outer\ surface}$+30 > $H_{center}$, and $H_{outer\ surface}$+30 − $H_{center} \geq 40$.

8 Claims, 2 Drawing Sheets

Related U.S. Application Data application No. 14/285,871, filed on May 23, 2014, and a continuation-in-part of application No. 13/958,854, filed on Aug. 5, 2013, said application No. 14/248,618 is a continuation-in-part of application No. 14/248,487, filed on Apr. 9, 2014, which is a continuation-in-part of application No. 13/958,854, filed on Aug. 5, 2013, and a continuation-in-part of application No. 14/035,074, filed on Sep. 24, 2013, said application No. 14/285,871 is a continuation-in-part of application No. 13/451,671, filed on Apr. 20, 2012, now Pat. No. 9,119,992.

(51) Int. Cl.
*C08L 23/08* (2006.01)
*C08L 75/04* (2006.01)

(52) U.S. Cl.
CPC ...... *A63B 37/0045* (2013.01); *A63B 37/0051* (2013.01); *A63B 37/0058* (2013.01); *A63B 37/0059* (2013.01); *A63B 37/0062* (2013.01); *A63B 37/0063* (2013.01); *A63B 37/0064* (2013.01); *A63B 37/0075* (2013.01); *A63B 37/0076* (2013.01); *C08L 13/00* (2013.01); *C08L 23/0876* (2013.01); *C08L 75/04* (2013.01)

(58) Field of Classification Search
USPC .......................................................... 473/376
See application file for complete search history.

(56) References Cited

U.S. PATENT DOCUMENTS

| | | |
|---|---|---|
| 5,273,286 A | 12/1993 | Sun |
| 5,274,041 A | 12/1993 | Yamada |
| 5,306,760 A | 4/1994 | Sullivan |
| 5,312,857 A | 5/1994 | Sullivan |
| 5,334,673 A | 8/1994 | Wu |
| 5,356,941 A | 10/1994 | Sullivan et al. |
| 5,482,285 A | 1/1996 | Yabuki et al. |
| 5,484,870 A | 1/1996 | Wu |
| 5,688,191 A | 11/1997 | Cavallaro et al. |
| 5,703,166 A | 12/1997 | Rajagopalan et al. |
| 5,705,565 A | 1/1998 | Hughes et al. |
| 5,733,206 A | 3/1998 | Nesbitt et al. |
| 5,743,816 A | 4/1998 | Ohsumi et al. |
| 5,772,531 A | 6/1998 | Ohsumi et al. |
| 5,776,012 A | 7/1998 | Moriyama et al. |
| 5,783,293 A | 7/1998 | Lammi |
| 5,789,475 A | 8/1998 | Chen |
| 5,803,831 A | 9/1998 | Sullivan et al. |
| 5,810,678 A | 9/1998 | Cavallaro et al. |
| 5,816,937 A | 10/1998 | Shimosaka et al. |
| 5,824,746 A | 10/1998 | Harris et al. |
| 5,885,172 A | 3/1999 | Hebert et al. |
| 5,891,973 A | 4/1999 | Sullivan et al. |
| 5,902,855 A | 5/1999 | Sullivan |
| 5,947,842 A | 9/1999 | Cavallaro |
| 5,952,415 A | 9/1999 | Hwang |
| 5,973,046 A | 10/1999 | Chen et al. |
| 5,981,658 A | 11/1999 | Rajagopalan et al. |
| 6,068,561 A | 5/2000 | Renard et al. |
| 6,071,201 A | 6/2000 | Maruko |
| 6,083,119 A | 7/2000 | Sullivan et al. |
| 6,100,321 A | 8/2000 | Chen |
| 6,113,831 A | 9/2000 | Nesbitt et al. |
| 6,117,025 A | 9/2000 | Sullivan |
| 6,132,324 A | 10/2000 | Hebert et al. |
| 6,150,462 A | 11/2000 | Rajagopalan et al. |
| 6,152,834 A | 11/2000 | Sullivan |
| 6,162,135 A | 12/2000 | Bulpett et al. |
| 6,180,040 B1 | 1/2001 | Ladd et al. |
| 6,210,293 B1 | 4/2001 | Sullivan |
| 6,213,895 B1 | 4/2001 | Sullivan et al. |
| 6,254,495 B1 * | 7/2001 | Nakamura ............ A63B 37/04 473/371 |
| 6,274,669 B1 | 8/2001 | Rajagopalan |
| 6,284,840 B1 | 9/2001 | Rajagopalan et al. |
| 6,291,592 B1 | 9/2001 | Bulpett |
| 6,299,550 B1 | 10/2001 | Molitor et al. |
| 6,309,314 B1 | 10/2001 | Sullivan et al. |
| 6,315,680 B1 | 11/2001 | Dalton et al. |
| 6,329,458 B1 | 12/2001 | Takesue et al. |
| 6,339,119 B1 | 1/2002 | Ladd et al. |
| 6,350,793 B1 | 2/2002 | Kennedy et al. |
| 6,355,715 B1 | 3/2002 | Ladd et al. |
| 6,376,037 B1 | 4/2002 | Montanari et al. |
| 6,425,833 B1 | 7/2002 | Sullivan et al. |
| 6,431,998 B1 | 8/2002 | Nakamura et al. |
| 6,475,417 B2 | 11/2002 | Nesbitt et al. |
| 6,476,130 B1 | 11/2002 | Rajagopalan et al. |
| 6,506,851 B2 | 1/2003 | Wu |
| 6,528,560 B2 | 3/2003 | Buhler |
| 6,537,158 B2 | 3/2003 | Watanabe |
| 6,538,099 B2 | 3/2003 | Isobe et al. |
| 6,562,906 B2 | 5/2003 | Chen |
| 6,565,454 B2 | 5/2003 | Halko |
| 6,565,456 B2 | 5/2003 | Hayashi et al. |
| 6,583,229 B2 | 6/2003 | Mano et al. |
| 6,592,470 B2 | 7/2003 | Watanabe et al. |
| 6,605,009 B1 | 8/2003 | Nakamura et al. |
| 6,616,549 B2 | 9/2003 | Dalton et al. |
| 6,624,221 B2 | 9/2003 | Takesue et al. |
| 6,632,147 B2 | 10/2003 | Cavallaro et al. |
| 6,635,716 B2 | 10/2003 | Voorheis et al. |
| 6,653,382 B1 | 11/2003 | Statz et al. |
| 6,656,059 B2 | 12/2003 | Umezawa et al. |
| 6,695,718 B2 | 2/2004 | Nesbitt |
| 6,702,694 B1 | 3/2004 | Watanabe |
| 6,723,008 B2 | 4/2004 | Higuchi et al. |
| 6,746,345 B2 | 6/2004 | Higuchi et al. |
| 6,756,436 B2 | 6/2004 | Rajagopalan et al. |
| 6,774,184 B2 | 8/2004 | Rajagopalan et al. |
| 6,783,468 B2 | 8/2004 | Sullivan et al. |
| 6,800,690 B2 | 10/2004 | Rajagopalan et al. |
| 6,815,480 B2 | 11/2004 | Statz et al. |
| 6,831,137 B2 | 12/2004 | Torre et al. |
| 6,833,400 B2 | 12/2004 | Ichikawa et al. |
| 6,835,794 B2 | 12/2004 | Wu et al. |
| 6,837,805 B2 | 1/2005 | Binette et al. |
| 6,838,501 B2 | 1/2005 | Takesue et al. |
| 6,849,006 B2 | 2/2005 | Cavallaro et al. |
| 6,855,070 B2 | 2/2005 | Hogge et al. |
| 6,872,774 B2 | 3/2005 | Sullivan et al. |
| 6,894,097 B2 | 5/2005 | Takesue et al. |
| 6,932,720 B2 | 8/2005 | Hogge et al. |
| 6,939,907 B2 | 9/2005 | Rajagopalan et al. |
| 6,943,231 B2 | 9/2005 | Buhler |
| 7,004,854 B2 | 2/2006 | Hogge et al. |
| 7,045,185 B2 | 5/2006 | Jacques et al. |
| 7,090,798 B2 | 8/2006 | Hebert et al. |
| 7,118,496 B2 | 10/2006 | Matroni et al. |
| 7,125,345 B2 | 10/2006 | Sullivan et al. |
| 7,147,578 B2 | 12/2006 | Nesbitt et al. |
| 7,182,702 B2 | 2/2007 | Hogge et al. |
| 7,198,576 B2 | 4/2007 | Sullivan et al. |
| 7,230,045 B2 | 6/2007 | Rajagopalan et al. |
| 7,279,529 B2 | 10/2007 | Hogge et al. |
| 7,297,737 B2 | 11/2007 | Fish, Jr. et al. |
| 7,348,046 B2 | 3/2008 | Liedoff et al. |
| 7,410,429 B1 | 8/2008 | Bulpett et al. |
| 7,458,905 B2 | 12/2008 | Comeau et al. |
| 7,528,196 B2 | 5/2009 | Kim et al. |
| 7,652,086 B2 | 1/2010 | Sullivan et al. |
| 7,722,482 B2 | 5/2010 | Sullivan et al. |
| 8,007,375 B2 | 8/2011 | Sullivan et al. |
| 8,007,376 B2 | 8/2011 | Sullivan et al. |
| 8,152,654 B2 | 4/2012 | Rajagopalan et al. |
| 8,182,368 B2 | 5/2012 | Kamino et al. |
| 8,309,643 B2 | 11/2012 | Thullen et al. |
| 8,399,557 B2 | 3/2013 | Montanari et al. |

(56) References Cited

U.S. PATENT DOCUMENTS

| | | |
|---|---|---|
| 8,465,381 B2 | 6/2013 | Rajagopalan et al. |
| 8,507,598 B2 | 8/2013 | Buhler et al. |
| 2001/0009310 A1 | 7/2001 | Hebert et al. |
| 2001/0046906 A1 | 11/2001 | Rajagopalan et al. |
| 2003/0190976 A1 | 10/2003 | Binette et al. |
| 2004/0082407 A1 | 4/2004 | Sullivan et al. |
| 2006/0122011 A1 | 6/2006 | Hogge et al. |
| 2007/0129172 A1 | 6/2007 | Cavallaro |
| 2008/0227568 A1 | 9/2008 | Sullivan et al. |
| 2009/0023515 A1 | 1/2009 | Tarao |
| 2009/0124414 A1 | 5/2009 | Sullivan et al. |
| 2009/0124415 A1 | 5/2009 | Sullivan et al. |
| 2009/0124416 A1 | 5/2009 | Sullivan et al. |
| 2009/0170634 A1 | 7/2009 | Loper et al. |
| 2010/0160079 A1 | 6/2010 | Kim et al. |
| 2010/0160082 A1 | 6/2010 | Rajagopalan et al. |
| 2010/0167845 A1 | 7/2010 | Kim et al. |
| 2010/0183837 A1 | 7/2010 | Hochstetter et al. |
| 2010/0203275 A1 | 8/2010 | Hoffmann et al. |
| 2010/0261551 A1 | 10/2010 | Felker et al. |
| 2011/0152450 A1 | 6/2011 | Kobayashi et al. |
| 2012/0184396 A1* | 7/2012 | Sullivan ............. A63B 37/0003 473/376 |
| 2012/0223453 A1 | 9/2012 | Grimes et al. |
| 2013/0202831 A1 | 8/2013 | Chhun et al. |
| 2013/0247983 A1 | 9/2013 | Jousset et al. |

OTHER PUBLICATIONS

DOW "Amplity GR Functional Polymers" (Aug. 2010) The DOW Chemical Company.

http:/www/tech-white-papers.com/ (Feb. 17, 2010) DuPont Polymer Modifiers, "Polyannide Toughening Using DuPont Polymer Modifiers".

\* cited by examiner

MULTI-LAYER CORE GOLF BALL

CROSS-REFERENCE TO RELATED APPLICATIONS

The present application is a continuation-in-part of co-pending: U.S. patent application Ser. No. 14/248,618, filed Apr. 9, 2014 ("'618 application"); U.S. patent application Ser. No. 14/285,871, filed May 23, 2014 ("'871 application"); and U.S. patent application Ser. No. 13/958,854, filed Aug. 5, 2013. The '618 application is a continuation-in-part of co-pending U.S. patent application Ser. No. 14/248,487, filed Apr. 9, 2014, which is a continuation-in-part of both co-pending U.S. patent application Ser. No. 13/958,854, filed Aug. 5, 2013, and co-pending U.S. patent application Ser. No. 14/035,074, filed Sep. 24, 2013. The '871 application is a continuation-in-part of co-pending U.S. patent application Ser. No. 13/451,671, filed Apr. 20, 2012. The entire disclosures of each of these applications are hereby incorporated herein by reference in their entireties.

FIELD OF THE INVENTION

The present invention relates to multi-layer golf balls having a very high positive gradient core, including a very soft, low compression inner core layer formed from an unfoamed composition.

BACKGROUND OF THE INVENTION

U.S. Pat. No. 8,182,368 to Kamino et al. discloses a golf ball wherein the difference between the JIS-C hardness H4 of the core at its surface and the JIS-C hardness H3 of the core outer layer at its innermost portion is equal to or greater than 10.

U.S. Pat. No. 8,007,376 to Sullivan et al. discloses a golf ball having an inner core layer with a negative hardness gradient and an outer core layer with a positive hardness gradient.

U.S. Pat. No. 7,410,429 to Bulpett et al. discloses a golf ball wherein the hardness of the inner core outer surface is the same as or lower than the hardness of the geometric center and the hardness of the outer core layer outer surface is greater than the hardness of the inner surface.

U.S. Pat. No. 6,695,718 to Nesbitt discloses a golf ball including a center core component preferably formed from a sulfur-cured polybutadiene and a core layer component preferably formed from a peroxide-cured polybutadiene and a metal salt of a fatty acid.

Despite these, and additional disclosures of golf balls having various hardness gradient properties, there remains a need for a very high positive gradient core, including a very soft, low compression inner core layer formed from an unfoamed composition. Such core would provide good durability while also contributing to spin reduction.

SUMMARY OF THE INVENTION

In one embodiment, the present invention is directed to a golf ball comprising a core and a cover. The core consists of an inner core layer, one or more optional intermediate core layers, and an outer core layer. The inner core layer is a solid layer formed from an unfoamed first thermoplastic composition $TP_1$, and has a diameter of 1.10 inch or less and a center Shore C hardness ($H_{center}$) of 50 or less. The outer core layer is formed from a second thermoplastic composition $TP_2$, has a thickness of 0.200 inches or greater, and an outer surface Shore C hardness ($H_{outer\ surface}$) of 70 or greater. The outer surface hardness of the outer core layer is at least 40 Shore C points greater than the center hardness of the inner core layer.

$H_{center}$ may alternatively be 45 or less, or 40 or less, or less than 40, or 35 or less, or less than 35, or 30 or less, or less than 30, or 25 or less or less than 25, or 20 or less, or less than 20, or 15 or less, or less than 15, or 13 or less, or less than 13, or a Shore C hardness within a range having a lower limit of 5 or 10 and an upper limit of 15 or 25 or 30 or 35 or 40.

The inner core layer may alternatively have a diameter of less than 1.10 inches, or 1.00 inches or less, or less than 1.00 inches, or 0.90 inches or less, or less than 0.90 inches, or 0.80 inches or less, or less than 0.80 inches, or 0.75 inches or less, or less than 0.75 inches, or a diameter within a range having a lower limit of 0.10 or 0.15 or 0.20 or 0.25 or 0.30 or 0.35 or 0.40 or 0.45 or 0.50 or 0.55 inches and an upper limit of 0.60 or 0.65 or 0.70 or 0.75 or 0.80 or 0.85 or 0.90 or 0.95 or 1.00 or 1.05 or 1.10 inches.

The inner core layer has an inner core outer surface having a Shore C hardness ($H_{cos}$) that differs from $H_{center}$ by up to 5 Shore C. In another embodiment, $H_{icos}$ and $H_{center}$ differ by up to about 5 Shore C. In one embodiment, $H_{center}$ is greater than $H_{icos}$ by up to 5 Shore C. In another embodiment, $H_{center}$ is less than $H_{icos}$ by up to 5 Shore C. In other embodiments, $H_{center}$ is greater than $H_{icos}$ by up to 4 Shore C, or by up to 3 Shore C, or by up to 2 Shore C, or by less than 2 Shore C. Alternatively, $H_{center}$ may be less than $H_{icos}$ by up to 4 Shore C, or by up to 3 Shore C, or by up to 2 Shore C, or by less than 2 Shore C. In one embodiment, $H_{center}$ and $H_{icos}$ are substantially the same.

$H_{outer\ surface}$ may alternatively be 75 or greater, or 70 or greater, or greater than 70, or 75 or greater, or greater than 75, 80 or greater, or greater than 80, or 85 or greater, or greater than 85, or 87 or greater, or greater than 87, or 89 or greater, or greater than 89, or 90 or greater, or greater than 90, or 91 or greater, or greater than 91, or 92 or greater, or greater than 92, or a Shore C hardness within a range having a lower limit of 80 or 85 or 87 or 89 and an upper limit of 90 or 91 or 92 or 95.

In one embodiment, $H_{outer\ surface}$ is greater than an outer core layer inner surface Shore C hardness ($H_{inner\ surface}$) by greater than 30. In another embodiment, $H_{outer\ surface}$ is greater than $H_{inner\ surface}$ by from 10 to 30. In yet another embodiment, $H_{outer\ surface}$ is greater than $H_{inner\ surface}$ by less than 10.

The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 inches.

In another embodiment, $H_{outer\ surface} - H_{center} \geq 45$. In yet another embodiment, $H_{outer\ surface} - H_{center} \geq 50$. In still another embodiment, $H_{outer\ surface} - H_{center} \geq 55$. In an alternative embodiment, $H_{outer\ surface} - H_{center} > 55$. In a different embodiment, $H_{outer\ surface} - H_{center} \geq 60$. In other embodiments, $H_{outer\ surface} - H_{center} > 60$, or $H_{outer\ surface} - H_{center} \geq 65$, or $H_{outer\ surface} - H_{center} > 65$, or $H_{outer\ surface} - H_{center} \geq 70$, or $H_{outer\ surface} - H_{center} > 70$, or $H_{outer\ surface} - H_{center} \geq 75$, or $H_{outer\ surface} - H_{center} > 75$, or $H_{outer\ surface} - H_{center} \geq 80$, or $H_{outer\ surface} - H_{center} > 80$.

Additionally, the inner core layer has an inner core interface Shore C hardness ($H_{inner\ core\ interface}$). The interface hardness of a core layer is defined herein as the extrapolated hardness from the curve produced by making hardness measurements on the cross-section of a core or ball radially outward from the center in about 2 mm increments. See, e.g., FIG. 1 and discussion below relating to FIG. 1.

The inner core layer has a negative hardness gradient wherein the interface Shore C hardness of the inner core layer is less than the center Shore C hardness, or a zero hardness gradient wherein the interface Shore C hardness of the inner core layer is within 1 Shore C unit of the center Shore C hardness, or positive hardness gradient wherein the interface Shore C hardness of the inner core layer is greater than the center Shore C hardness.

In a particular embodiment, the inner core layer has a center Shore C hardness ($H_{center}$) within a range having a lower limit of 1 or 5 or 10 and an upper limit of 15 or 25 or 30 or 35 or 40 and an interface Shore C hardness ($H_{inner\ core\ interface}$) within a range having a lower limit of 5 or 10 or 15 and an upper limit of 15 or 20 or 25 or 30 or 35 or 40 or 50, and has an overall zero hardness gradient wherein $H_{inner\ core\ interface} = H_{center}$ or wherein $-1 < H_{inner\ core\ interface} - H_{center} < 1$; or a positive hardness gradient wherein:

$$1 < H_{inner\ core\ interface} - H_{center} < 45,$$

$$\text{or } 1 < H_{inner\ core\ interface} - H_{center} < 15,$$

$$\text{or } 1 < H_{inner\ core\ interface} - H_{center} < 5.$$

For example, in one embodiment, $1 < H_{inner\ core\ interface} - H_{center} \leq 5$. In another embodiment, $2 < H_{inner\ core\ interface} - H_{center} \leq 5$. In yet another embodiment, $3 < H_{inner\ core\ interface} - H_{center} \leq 5$. In an alternative embodiment, $4 < H_{inner\ core\ interface} - H_{center} \leq 5$.

In other embodiments, the inner core layer may have an overall negative hardness gradient. For example, in one embodiment, $-1 > H_{inner\ core\ interface} - H_{center} \geq -5$. In yet another embodiment, $-2 > H_{inner\ core\ interface} - H_{center} \geq -5$. In still another embodiment, $-3 > H_{inner\ core\ interface} - H_{center} \geq -5$. In a different embodiment, $-4 > H_{inner\ core\ interface} - H_{center} \geq -5$.

In one embodiment, the outer core layer has an outer core interface Shore C hardness ($H_{outer\ core\ interface}$) such that $H_{outer\ core\ interface} - H_{inner\ core\ interface} \leq H_{outer\ surface} - H_{center}$. This occurs, for example, where: (i) $H_{inner\ core\ interface} > H_{center}$, and $H_{outer\ core\ interface} = H_{outer\ surface}$; (ii) $H_{inner\ core\ interface} = H_{center}$, and $H_{outer\ core\ interface} < H_{outer\ surface}$; (iii) $H_{inner\ core\ interface} > H_{center}$, and $H_{outer\ core\ interface} < H_{outer\ surface}$; and/or (iv) $H_{inner\ core\ interface} = H_{center}$, and $H_{outer\ core\ interface} = H_{outer\ surface}$.

A non-limiting example of (i) is where $H_{outer\ core\ interface}$ (85 Shore C)$-H_{inner\ core\ interface}$ (50 Shore C)$\leq H_{outer\ surface}$ (85 Shore C)$-H_{center}$(45 Shore C). In turn, an example of (ii) is where $H_{outer\ core\ interface}$ (80 Shore C)$-H_{inner\ core\ interface}$ (50 Shore C)$\leq H_{outer\ surface}$(85 Shore C)$-H_{center}$(50 Shore C). And an example of (iii) is where $H_{outer\ core\ interface}$ (80 Shore C)$-H_{inner\ core\ interface}$ (55 Shore C)$< H_{outer\ surface}$(85 Shore C)$-H_{center}$(50 Shore C). Finally, one example of (iv) is where $H_{outer\ core\ interface}$ (85 Shore C)$-H_{inner\ core\ interface}$ (50 Shore C)$= H_{outer\ surface}$(85 Shore C)$-H_{center}$(50 Shore C).

In another embodiment, the outer core layer has an outer core interface Shore C hardness ($H_{outer\ core\ interface}$) such that $H_{outer\ core\ interface} - H_{inner\ core\ interface} > H_{outer\ surface} - H_{center}$. This occurs, for example, where: (v) $H_{inner\ core\ interface} < H_{center}$, and $H_{outer\ core\ interface} = H_{outer\ surface}$; (vi) $H_{inner\ core\ interface} = H_{center}$, and $H_{outer\ core\ interface} > H_{outer\ surface}$; or (vii) $H_{inner\ core\ interface} < H_{center}$, and $H_{outer\ core\ interface} > H_{outer\ surface}$.

A non-limiting example of (v) is where $H_{outer\ core\ interface}$ (85 Shore C)$-H_{inner\ core\ interface}$ (45 Shore C)$> H_{outer\ surface}$ (85 Shore C)$-H_{center}$(50 Shore C). In turn, an example of (vi) is where $H_{outer\ core\ interface}$ (85 Shore C)$-H_{inner\ core\ interface}$ (50 Shore C)$> H_{outer\ surface}$(80 Shore C)$-H_{center}$(50 Shore C). And an example of (vii) is where $H_{outer\ core\ interface}$ (85 Shore C)$-H_{inner\ core\ interface}$ (45 Shore C)$< H_{outer\ surface}$(80 Shore C)$-H_{center}$(50 Shore C).

Non-limiting examples of suitable thermoplastic compositions for $TP_1$ and/or $TP_2$ include at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

In one embodiment, the thermoplastic compositions for the inner core layer and outer core layer have the same classification—e.g. each being a primarily iomomeric material, or HNP. In a different embodiment, the thermoplastic compositions for the inner core layer and outer core layer have different classifications—e.g., the inner core layer comprising a primarily iomomeric material, whereas the outer core layer comprises a stiff thermoplastic polyurethane material.

Optional intermediate core layers are disposed between the inner core layer and outer core layer and have an individual layer thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 or 0.150 or 0.200 or 0.250 or inches.

In one non-limiting embodiment, the core includes an intermediate layer formed from a thermoset rubber-based composition. Suitable thermoset compositions include, for example, a rubber-based composition comprising at least one of natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations thereof.

In another non-limiting embodiment, the core includes an intermediate layer formed from an HNP composition. A core intermediate layer may have a hardness in the range of from about 10 Shore C to about 90 Shore C.

The multilayer core has an overall diameter of 1.00 inch or greater, or 1.20 inches or greater, or 1.25 inches or greater, or 1.30 inches or greater, or 1.35 inches or greater, or 1.40 inches or greater, or 1.45 inches or greater, or 1.50 inches or greater, or 1.51 inches or greater, or 1.53 inches or greater, or 1.55 inches or greater, or an overall diameter within a range having a lower limit of 0.50 or 0.70 or 0.75 or 0.80 or 0.85 or 0.90 or 0.95 or 1.00 or 1.10 or 1.15 or 1.20 or 1.25 or 1.30 or 1.35 or 1.40 or 1.45 or 1.50 or 1.51 or 1.53 or 1.55 and an upper limit of 1.55 or 1.60 or 1.61 or 1.62 or 1.63 or 1.64 inches.

The inner core layer has a compression of 40 or less, or 30 or less, or 25 or less, or less than 25, or 20 or less, or less than 20, or 15 or less, or less than 15, or 10 or less, or less than 10, or 5 or less, or less than 5, or 0 or less, or less than 0. Meanwhile, the core has an overall compression of 50 or greater, or 60 or greater, or 65 or greater, or 70 or greater, or 80 or greater, or greater than 80, or 85 or greater, or greater than 85, or 90 or greater, or an overall compression within a range having a lower limit of 50 or 60 or 65 or 70 or 80 or 85 and an upper limit of 90 or 95 or 100 or 110.

The inner core layer has a coefficient of restitution ("COR") at 125 ft/s of 0.780 or less, or 0.650 or less, or 0.600 or less, or 0.550 or less, and the multilayer core has an overall COR of 0.795 or greater, or 0.800 or greater, or 0.810 or greater, or 0.815 or greater, or 0.820 or greater.

Golf balls of the present invention typically have a COR of 0.700 or greater, preferably 0.750 or greater, and more preferably 0.780 or greater. Golf balls of the present invention typically have a compression of 40 or greater, or a compression within a range having a lower limit of 50 or 60 and an upper limit of 100 or 120.

In one embodiment, a golf ball of the invention incorporates an intermediate layer (or inner cover layer) between the core and the cover (or between the core and outer cover layer). In such an embodiment, the intermediate layer or inner cover layer, formed about the core, has a surface hardness of from about 50 Shore D to about 80 Shore D.

The finished golf ball has a compression that is greater than a compression of the inner core layer and outer core layer, combined. In one embodiment, the compression of the finished golf ball is greater than the compression of the inner core layer and outer core layer, combined, by at least 10%. In another embodiment, the compression of the finished golf ball is greater than the compression of the inner core layer and outer core layer, combined, by at least 15%. In yet another embodiment, the compression of the finished golf ball is greater than the compression of the inner core layer and outer core layer, combined, by at least 20%, or by at least 25%, or by at least 30%, or by at least 35%, or by at least 40%, or by at least 50%, or by at least 55%, or by about 60% or greater.

Outer Core Layer $TP_2$ Incorporating Transparent or Plasticized Polyamides

In a different construction, a golf ball of the invention comprises a core and a cover, the core consisting of an inner core layer, one or more optional intermediate core layers, and an outer core layer. The inner core layer is a solid layer formed from an unfoamed first thermoplastic composition $TP_1$, and has a diameter of 1.10 inches or less and a center Shore C hardness ($H_{center}$) of 50 or less. The outer core layer is formed from a second thermoplastic composition $TP_2$ comprising a transparent or plasticized polyamide, has a thickness of 0.200 inches or greater, and an outer surface Shore D hardness ($H_{outer\ surface}$) of 55 or greater. Meanwhile, the Shore D hardness of the outer surface, plus 30, is greater than the center Shore C hardness of the inner core layer by at least 40.

The center Shore C hardness $H_{center}$ is greater than 0 and up to 50. In one embodiment, $H_{center}$ is from about 25 to 50.

The inner core layer may have a diameter of from about 0.10 inch to 1.10 inches. For example, the inner core layer may have a diameter of from about 0.10 inch to 1.0 inch, or from about 0.25 inch to 0.90 inch, or from about 0.45 inch to 0.85 inch.

The inner core layer may have an inner core outer surface Shore C hardness ($H_{icos}$) that differs from the center Shore C hardness $H_{center}$ by up to about 5 Shore C. That is, in some embodiments, $H_{center}$ is greater than $H_{icos}$ by up to 5 Shore C, and in other embodiments, $H_{center}$ is less than $H_{icos}$ by up to about 5 Shore C. In still other embodiments, $H_{center}$ and $H_{icos}$ are substantially the same.

In one embodiment, the outer surface Shore D hardness $H_{outer\ surface}$ is from 55 to about 95. In another embodiment $H_{outer\ surface}$ may be greater than 65 and less than about 85. In still other embodiments, $H_{outer\ surface}$ may be from about 75 to about 95.

In one embodiment, the outer surface Shore D hardness $H_{outer\ surface}$ is greater than an outer core layer interface Shore D hardness ($H_{outer\ core\ interface}$) by greater than 20. In another embodiment, the outer surface Shore D hardness $H_{outer\ surface}$ is greater than the outer core layer interface Shore D hardness $H_{outer\ core\ interface}$ by from 10 to 20. In yet another embodiment, the outer core layer interface Shore D hardness $H_{outer\ surface}$ is greater than the outer core layer interface Shore D hardness H outer core interface by less than 10.

The outer core layer has a thickness of at least 0.200 inch, and as great as about 0.500 inches, for example. In one embodiment, the outer core layer may have a thickness of greater than 0.250 inch and up to about 0.450 inches. In still another embodiment, the outer core layer may have a thickness of greater than 0.200 inch and up to about 0.350 inches.

In another embodiment, the outer surface Shore D hardness $H_{outer\ surface}$+30–the center Shore C hardness $H_{center} \geq$ about 55. In yet another embodiment, the outer surface Shore D hardness $H_{outer\ surface}$+30–the center Shore C hardness $H_{center}$>about 70. In still another embodiment, the outer surface Shore D hardness $H_{outer\ surface}$+30–the center Shore C hardness $H_{center} \geq$ about 85.

The inner core layer meanwhile has an inner core interface Shore C hardness ($H_{inner\ core}$ interface). The inner core layer has a negative hardness gradient wherein the inner core interface Shore C hardness ($H_{inner\ core\ interface}$) is less than the center Shore C hardness, or a zero hardness gradient wherein the inner core interface Shore C hardness ($H_{inner\ core\ interface}$) is within 1 Shore C unit of the center Shore C hardness, or positive hardness gradient wherein inner core interface Shore C hardness ($H_{inner\ core\ interface}$) is greater than the center Shore C hardness.

The inner core layer may have an overall zero hardness gradient between center Shore C hardness ($H_{center}$) and interface Shore C hardness ($H_{inner\ core\ interface}$), wherein $H_{inner\ core\ interface}=(H_{center})$. Or, in another embodiment, $-1 < H_{inner\ core\ interface} - H_{center} < 1$. In yet another embodiment, the inner core layer may have a positive hardness gradient between center Shore C hardness ($H_{center}$) and interface Shore C hardness ($H_{inner\ core\ interface}$) wherein:

$$1 < H_{inner\ core\ interface} - H_{center} < 45,$$

$$\text{or } 1 < H_{inner\ core\ interface} - H_{center} < 15,$$

$$\text{or } 1 < H_{inner\ core\ interface} - H_{center} < 5.$$

For example, in one embodiment, $1 < H_{inner\ core\ interface} - H_{center} \leq 5$. In another embodiment, $2 < H_{inner\ core\ interface} - H_{center} \leq 5$. In yet another embodiment, $3 \leq H_{inner\ core\ interface} - H_{center} \leq 5$. In an alternative embodiment, $4 < H_{inner\ core\ interface} - H_{center} \leq 5$.

In other embodiments, the inner core layer may have an overall negative hardness gradient. For example, in one embodiment, $-1 > H_{inner\ core\ interface} - H_{center} \geq -5$.

In one embodiment, the outer core layer has an outer core interface Shore D hardness ($H_{outer\ core\ interface}$) such that the Shore D $H_{outer\ core\ interface}$–the Shore C $H_{inner\ core\ interface} \leq$ the Shore D $H_{outer\ surface}$–the Shore $CH_{center}$. This occurs, for example, where: (i) the Shore C $H_{inner\ core\ interface}$>the Shore C $H_{center}$, and the Shore D $H_{outer\ core\ interface}$=the Shore D $H_{outer\ surface}$; (ii) the Shore C $H_{inner\ core\ interface}$=the Shore C $H_{center}$, and the Shore D $H_{outer\ core\ interface}$<the Shore D $H_{outer}$ surface; (iii) the Shore C $H_{inner\ core\ interface}$>the Shore C $H_{center}$, and the Shore D $H_{outer\ core\ interface}$<the Shore D $H_{outer\ surface}$; and/or (iv) the Shore C $H_{inner\ core\ interface}$=the Shore $CH_{center}$, and the Shore D $H_{outer\ core\ interface}$=the Shore D $H_{outer\ surface}$.

A non-limiting example of (i) is where the Shore D $H_{outer\ core\ interface}$ (55)–the Shore C $H_{inner\ core\ interface}$ (50)≤ the Shore D $H_{outer\ surface}$ (55)–the Shore $CH_{center}$(45). In turn, an example of (ii) is where the Shore D $H_{outer\ core\ interface}$ (50)–the Shore C $H_{inner\ core\ interface}$ (50)< the Shore D $H_{outer\ surface}$ (55)–the Shore C $H_{center}$(50). And an example of (iii) is where the Shore D $H_{outer\ core\ interface}$ (50)–the Shore C $H_{inner\ core\ interface}$ (55)<the Shore D $H_{outer\ surface}$ (55)–the Shore C $H_{center}$(50). Finally, one example of (iv) is where the Shore D $H_{outer\ core\ interface}$ (55)–the Shore C $H_{inner\ core\ interface}$ (50)=the Shore D $H_{outer\ surface}$+(55)–the Shore C $H_{center}$(50).

In another embodiment, the outer core layer has an outer core interface Shore D hardness ($H_{outer\ core\ interface}$) such that the Shore D $H_{outer\ core\ interface}$–the Shore C $H_{inner\ core\ interface}$>$H_{outer\ surface}$–$H_{center}$. This occurs, for example, where: (v) the Shore C $H_{inner\ core\ interface}$<the Shore C $H_{center}$, and the Shore D $H_{outer\ core\ interface}$=the Shore D $H_{outer\ surface}$; (vi) the Shore C $H_{inner\ core\ interface}$=the Shore C $H_{center}$, and the Shore D $H_{outer\ core\ interface}$>the Shore D $H_{outer\ surface}$; or (vii) the Shore C $H_{inner\ core\ interface}$<the Shore $CH_{center}$ and the Shore D $H_{outer\ core\ interface}$>the Shore D $H_{outer\ surface}$.

A non-limiting example of (v) is where the Shore D $H_{outer\ core\ interface}$ (55)–the Shore C $H_{inner\ core\ interface}$ (45 Shore C)>the Shore D $H_{outer\ surface}$ (55)–the Shore $CH_{center}$ (50). In turn, an example of (vi) is where the Shore D $H_{outer\ core\ interface}$ (60)–the Shore C $H_{inner\ core\ interface}$ (50)>the Shore D $H_{outer\ surface}$ (55)–the Shore $CH_{center}$(50). And an example of (vii) is where the Shore D $H_{outer\ core\ interface}$ (65)–the Shore C $H_{inner\ core\ interface}$ (45)>the Shore D $H_{outer\ surface}$ (55)–the Shore C the Shore C $H_{center}$(50).

Non-limiting examples of suitable thermoplastic compositions for $TP_1$ include at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

Embodiments are also envisioned wherein outer core layer $TP_2$ further comprises (in addition to the at least one transparent or plasticized polyamide) at least one thermoplastic material being a primarily ionomeric material, or HNP. In a different embodiment, the outer core layer $TP_2$ may further comprise (in addition to the at least one transparent or plasticized polyamide) at least one thermoplastic material comprising a stiff thermoplastic polyurethane material.

In one non-limiting embodiment, the core includes an intermediate core layer formed from a thermoset rubber-based composition. Suitable thermoset compositions include, for example, a rubber-based composition comprising at least one of natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations thereof.

DETAILED DESCRIPTION

Figure 1:
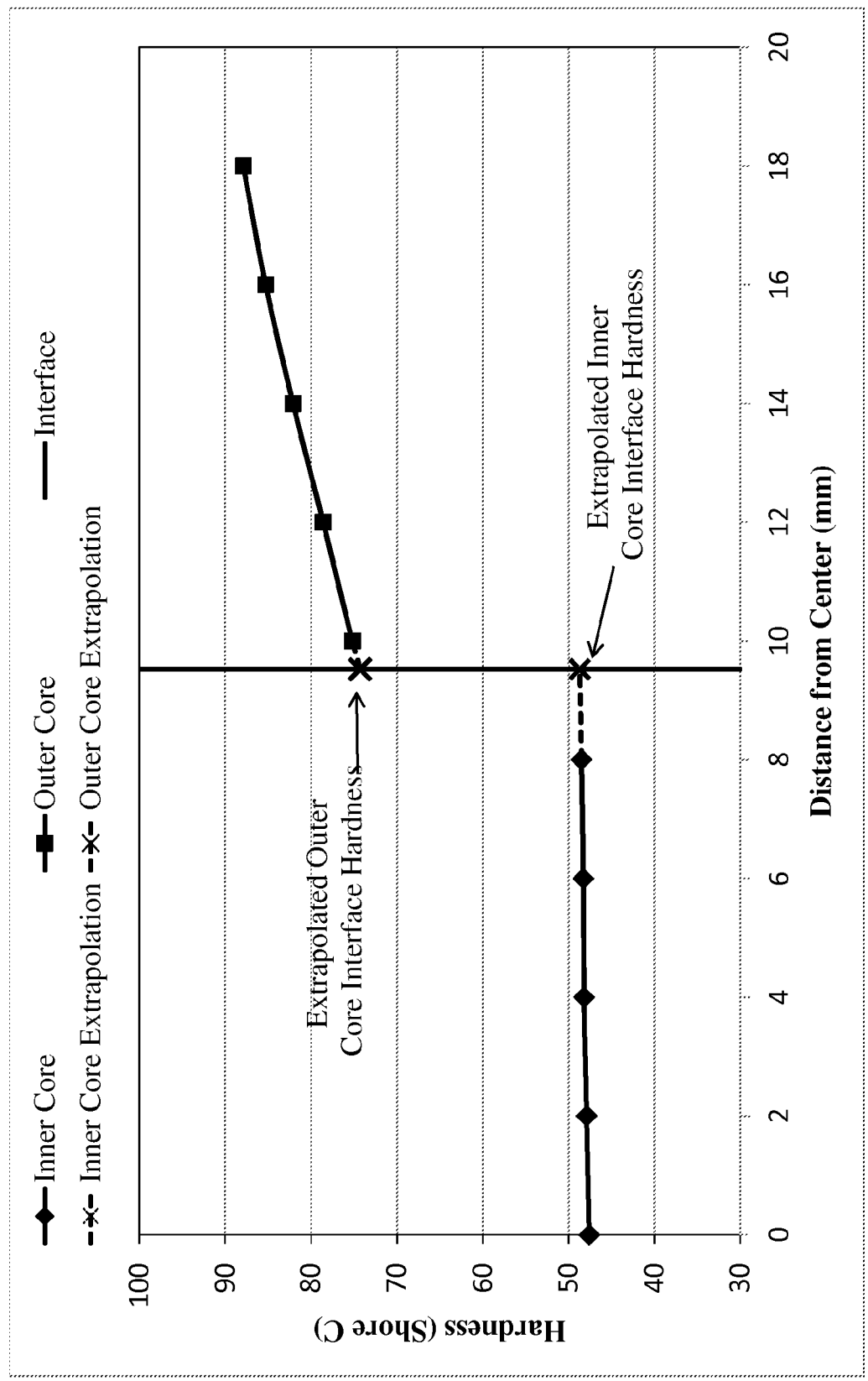
FIG. 1 is a graph depicting core hardness as a function of distance from the center and further depicting extrapolated interfaces for the inner and outer core layers according to one embodiment of a golf ball of the invention.

A golf ball of the invention produces a desired spin profile of reduced spin off the driver meanwhile maintaining moderate spin off wedges and irons. Several embodiments of a golf ball of the invention are illustrated in prophetic golf balls Ex. 1, Ex. 2, Ex. 3, and Ex. 4 and compared with one conventional prophetic golf ball Comp. Ex. 1 herein below.

Prophetic inventive golf balls Ex. 1, Ex. 2, Ex. 3, Ex. 4 and comparative prophetic golf ball Comp. Ex. 1 each comprise a core, a cover, and an intermediate layer disposed between the core and the cover. Additionally, every core is a dual core comprising an inner core layer surrounded by an outer core layer.

The inner core layers of inventive prophetic golf balls Ex. 1, Ex. 2, Ex. 3, and Ex. 4 are each formed from a different thermoplastic material, namely Elvax®150 (ethylene-vinyl acetate copolymer (EVA)), Nucrel®9-1(olefin-unsaturated carboxylic acid ester terpolymer), Kraton® D0243 B(styrene block copolymer), and Riteflex®425(thermoplastic polyester elastomer), respectively. In turn, the outer core layers of golf balls Ex. 1, Ex. 2, Ex. 3, and Ex. 4 are also each formed from a different thermoplastic composition as formulated in TABLE I:

TABLE I

| | OUTER CORE LAYER MATERIALS ($TP_2$) | | | |
|---|---|---|---|---|
| Ingredients (Phr) | Ex. 1 $TP_2(1)$ | Ex. 2 $TP_2(2)$ | Ex. 3 $TP_2(3)$ | Ex. 4 $TP_2(4)$ |
| Primacor ® 5980I[1] | 43 | 48 | 48 | 47 |
| Fusabond ® N525[2] | 11 | * | 12 | * |
| Elvaloy ® AC 3427[3] | * | * | * | 13 |
| Kraton FG1924 G[4] | * | 12 | * | * |
| Ethyl Oleate | 10 | * | * | * |
| Oleic Acid | 36 | 40 | 40 | 40 |
| $Mg(OH)_2$ | 8.0 | 8.9 | 8.9 | 8.8 |

[1]Primacor ® 5980I is an Ethylene/-Acrylic Acid Copolymer available from Dow Chemical Company.
[2]Fusabond ® N525 is an anhydride modified ethylene copolymer available. from E.I. du Pont de Nemours and Company, Inc.
[3]Elvaloy ® AC 3427 is a copolymer of ethylene and butyl acrylate available from E.I. du Pont de Nemours and Company, Inc.
[4]Kraton FG1924 G is a linear triblock copolymer based on styrene and ethylene/butylene with a polystyrene content of 13% (Styrene block copolymer) available from Kraton Polymers.

Meanwhile, in comparative golf ball Comp. Ex. 1, both the inner core layer and outer core layer are formed from conventional thermoset rubber-based compositions as formulated in TABLE II below. As shown in TABLE II, core formulations 1 and 2 differ from each other at least by the amount of peroxide, the amount of zinc diacrylate, and presence/absence of an antioxidant:

TABLE II

| | GOLF BALL COMP. EX. 1 CORE LAYERS MATERIALS | |
|---|---|---|
| Ingredients (Phr) | OUTER CORE LAYER ( Core Formulation 1) | INNER CORE LAYER (Core formulation 2) |
| Polybutadiene | 100 | 100 |
| Zinc Oxide | 5 | 5 |
| Zinc diacrylate (ZDA) | 35 | 31 |
| Perkadox ® BC[5] | 0.5 | * |

TABLE II-continued

GOLF BALL COMP. EX. 1
CORE LAYERS MATERIALS

| Ingredients (Phr) | OUTER CORE LAYER (Core Formulation 1) | INNER CORE LAYER (Core formulation 2) |
|---|---|---|
| Trigonox ® 265[6] | * | 1 |
| Antioxidant | * | 0.4 |
| ZnPCTP | 0.5 | 0.5 |

[5]Perkadox ® BC is an initiating agent (Dicumyl peroxide) available from Akzo Nobel.
[6]Trigonox ® 265 is an initiating agent available from Akzo Nobel.

TABLE III incorporates the details of TABLE I and TABLE II therein and further specifies the construction and certain additional properties for each of golf balls Ex. 1, Ex. 2, Ex. 3, Ex. 4 and Comp. Ex. 1:

TABLE III

| Golf Ball Construction & Properties | EXAMPLES | | | | |
|---|---|---|---|---|---|
| | Ex. 1 | Ex. 2 | Ex. 3 | Ex. 4 | Comp. Ex. 1 |
| Inner Core Material | Elvax ® 150[7] | Nucrel ® 9-1[8] | Kraton ® D0243 B[9] | Riteflex ® 425[10] | Core Formulation 2[11] |
| Inner Core Diameter (in.) | 0.75 | 0.50 | 0.75 | 0.50 | 1.00 |
| Center Hardness (Shore C) | 26.8 | 48.6 | 35.5 | 43.3 | 71.0 |
| Inner Core Compression | ≤40 | ≤40 | ≤40 | ≤40 | >40 |
| Outer Core Material | $TP_2$ (1) | $TP_2$ (2) | $TP_2$ (3) | $TP_2$ (4) | Core Formulation 1[11] |
| Outer Core Thickness (in.) | 0.400 | 0.525 | 0.400 | 0.525 | 0.275 |
| Outer Core Surf. Hardness (Shore C) | 84.5 | 91.5 | 91.1 | 88.6 | 87.5 |
| Dual Core Compression | 65 | 98 | 69 | 89 | 88 |
| Intermediate Layer Material | Surlyn ® 7940/8940[12] | Surlyn ® 7940/8940 | Surlyn ® 7940/8940 | Surlyn ® 7940/8940 | Surlyn ® 7940/8940 |
| Intermediate Layer Thickness (in.) | 0.035 | 0.035 | 0.035 | 0.035 | 0.035 |
| Intermediate Layer Hardness (Shore D) | 68.9 | 69.1 | 69.2 | 69.5 | 69.3 |
| Cover Material | MDI[13]/PTMEG[14]/E-300[15] | MDI/PTMEG/E-300 | MDI/PTMEG/E-300 | MDI/PTMEG/E-300 | MDI/PTMEG/E-300 |
| Cover Thickness (in.) | 0.030 | 0.030 | 0.030 | 0.030 | 0.030 |
| Cover Hardness (Shore C) | 82.3 | 82.5 | 81.9 | 82.2 | 82.1 |
| Ball Compression | 72 | 110 | 79 | 91 | 99 |

[7]Elvax ® 150 is an ethylene-vinyl acetate copolymer resin (EVA) available from E.I. du Pont de Nemours and Company, Inc.
[8]Nucrel ® 9-1 is an olefin-unsaturated carboxylic acid ester terpolymer available from E.I. du Pont de Nemours and Company, Inc.
[9]Kraton ® D0243 B is a diblock copolymer based on styrene and butadiene with a polystyrene content of 33% (styrene block copolymer) available from Kraton Polymers.
[10]Riteflex ® 425 is a thermoplastic polyester elastomer available from Ticona.
[11]Core Formulations 1&2 as set forth in TABLE I above.
[12]Surlyn ® 7940 (Li) and Surlyn ® 8940 (Na), are medium acid, monovalent and medium flow ionomers.
[13]Methylene diphenyl diisocyanate.
[14]Polytetramethylene ether glycol.
[15]Ethacure 300, dimethylthiotoluene diamine, sold by Albemarle.

Referring to golf balls Ex. 1, Ex. 2, Ex. 3, and Ex. 4 of TABLE III, each dual core comprises a very soft, low compression inner core layer surrounded by a hard higher compression outer core layer. Additionally, each inner core layer has a diameter of less than 1.10 inches, is formed from an unfoamed thermoplastic composition, and has a center Shore C hardness of 50 or less.

Meanwhile, each outer core layer has a thickness of 0.200 inches or greater, is formed from a second thermoplastic composition that is different than the thermoplastic material of the inner core layer, and has an outer surface Shore C hardness of 80 or greater. Finally, in each of the dual cores of golf balls Ex. 1, Ex. 2, Ex. 3, and Ex. 4, the outer core layer has an outer surface hardness that is at least 40 Shore C points greater than the center hardness of the inner core layer.

Specifically referring to golf ball Ex. 1, the EVA inner core layer has a diameter of 0.75 in., and has a center Shore C hardness of 26.8. The outer core layer meanwhile has a thickness of 0.400 in., is formed from core formulation $TP_2(1)$, and has an outer surface Shore C hardness of 84.5. The outer surface hardness of the outer core layer of golf ball Ex. 1 is therefore "at least 40 Shore C points greater than the center hardness of the inner core layer" (namely 57.7 Shore C points greater than the center hardness).

Notably, in golf ball Ex. 3, $TP_2(3)$ differs from $TP_2(1)$ of golf ball Ex. 1 at least in that $TP_2(1)$ includes ethyl oleate, whereas $TP_2(3)$ does not. Several property differences may also be noted between golf balls Ex. 3 and Ex. 1, respectively: inner core layer center Shore C hardnesses (35.5 versus 26.8); outer core layer surface Shore C hardnesses (91.1 versus 84.5); dual core compressions (69 versus 65); intermediate layer Shore D hardnesses (69.2 versus 68.9); cover layer surface shore C hardness (81.9 versus 82.3); and golf ball compression (79 versus 72). Nevertheless, golf ball Ex. 3 has an outer core layer outer surface hardness that is greater than the center hardness of the inner core layer by 55.6 Shore C hardness points, which is well above "at least 40 Shore C points greater". Property difference between golf balls Ex. 3 and Ex. 1 may be attributed to the outer core layer formulation differences between TP$_2$(3) and TP$_2$(1) as well to the inner core material difference (styrene block copolymer versus EVA).

Regarding golf ball Ex. 4, it is also notable that TP$_2$(4) differs from TP$_2$(2) of golf ball Ex. 2 at least in that TP$_2$(4) includes a copolymer of ethylene and butyl acrylate, whereas TP$_2$(2) includes a styrene block copolymer instead. Several property differences may also be noted between golf balls Ex. 4 and Ex. 2, respectively: inner core layer center Shore C hardnesses (43.3 versus 48.6); outer core layer surface Shore C hardnesses (88.6 versus 91.5); dual core compressions (89 versus 98); intermediate layer Shore D hardnesses (69.5 versus 69.1); cover layer surface shore C hardness (82.2 versus 82.5); and golf ball compression (91 versus 110). Yet both golf balls Ex. 2 and Ex. 4 have a very high positive hardness gradient wherein the outer surface hardness of the outer core layer is at least 40 Shore C points greater than the center hardness of the inner core layer, namely by 42.9 and 45.7 Shore C hardness points, respectively. Once again, property difference between golf balls Ex. 4 and Ex. 2 may be attributed to the outer layer formulation difference between TP$_2$(4) and TP$_2$(2) as well as to the differing inner core materials (thermoplastic polyester elastomer versus olefin-unsaturated carboxylic acid ester terpolymer).

Comparative golf ball Comp. Ex. 1, unlike golf balls Ex. 1, Ex. 2, Ex. 3, and Ex. 4, incorporates conventional thermoset rubber-based compositions in both the inner core layer and an outer core layer. The inner core layer of Comp. Ex. 1 is formed from a conventional thermoset rubber-based composition having a center Shore C hardness well above 50 (namely 71). Meanwhile, the outer core layer of Comp. Ex. 1 has an outer surface Shore C hardness that is not "at least 40 Shore C points greater than the center hardness of the inner core layer" but rather, well below that, namely only 16.5 Shore C points greater. Furthermore, Accordingly, each of golf balls Ex. 1, Ex. 2, Ex. 3, and Ex. 4 incorporates a core having a steep positive Shore C hardness gradient progressing from a hard core outer surface to a very soft center, whereas the core of golf ball Comp. Ex. 1 has a center Shore C hardness above 50 and a much more shallow Shore C hardness gradient from outer surface to center and well below "at least 40".

Several different embodiments of a golf ball of the invention are illustrated in prophetic golf balls Ex. 5, Ex. 6, Ex. 7, and Ex. 8 and compared with one conventional prophetic golf ball Comp. Ex. 2 herein below in TABLES IV:

TABLE IV

| Golf Ball Construction & Properties | EXAMPLES | | | | |
|---|---|---|---|---|---|
| | Ex. 5 | Ex. 6 | Ex. 7 | Ex. 8 | Comp. Ex. 2 |
| Inner Core Layer Material | Elvax ® 150[16] | Nucrel ® 9-1[17] | Kraton ® D0243 B[18] | Riteflex ® 425[19] | Core Formulat. 2[20] |
| Inner Core Layer Diam. (in.) | 0.75 | 0.50 | 0.75 | 0.50 | 1.00 |
| Center Hardness (Shore C) | 27.1 | 48.1 | 36.4 | 42.8 | 71.0 |
| Outer Core Layer Material | Grilamid ® TR90[21] | Rilsan ® Clear G350[22] | Pebax ® Clear 400[23] | Trogamid ® T5000[24] | Core Formulat. 1[20] |
| Outer Core Layer Thickness (in.) | 0.400 | 0.525 | 0.400 | 0.525 | 0.275 |
| Outer Core Surf. Hardness (Shore D) | 82.7 | 79.6 | 62.3 | 87.0 | 60.1 |
| Intermediate Layer Material | Surlyn ® 7940/8940[25] | Surlyn ® 7940/8940 | Surlyn ® 7940/8940 | Surlyn ® 7940/8940 | Surlyn ® 7940/8940 |
| Intermediate Layer Thickness (in.) | 0.035 | 0.035 | 0.035 | 0.035 | 0.035 |
| Intermediate Layer Hardness (Shore D) | 69.7 | 69.2 | 68.8 | 70.7 | 69.3 |
| Cover Material | MDI[26]/ PTMEG[27]/ E-300[28] | MDI/ PTMEG/ E-300 | MDI/ PTMEG/ E-300 | MDI/ PTMEG/ E-300 | MDI/ PTMEG/ E-300 |
| Cover Thickness (in.) | 0.030 | 0.030 | 0.030 | 0.030 | 0.030 |
| Cover Hardness (Shore C) | 83.1 | 83.4 | 82.7 | 84.1 | 82.1 |

[16]Elvax150 is an ethylene-vinyl acetate copolymer resin (EVA) available from E.I. du Pont de Nemours and Company, Inc.
[17]Nucrel ® 9-1 is an olefin-unsaturated carboxylic acid ester terpolymer available from E.I. du Pont de Nemours and Company, Inc.
[18]Kraton ® D0243 B is a diblock copolymer based on styrene and butadiene with a polystyrene content of 33% (styrene block copolymer) available from Kraton Polymers.
[19]Riteflex ® 425 is a thermoplastic polyester elastomer available from Ticona.
[20]Core Formulations 1&2 as set forth in TABLE I above.
[21]Grilamid ® TR90 is a transparent polyamide from EMS-GRIVORY
[22]Rilsan ® Clear G350 is a transparent polyamide from ARKEMA Technical Polymers
[23]Pebax ® Clear 400 is a transparent polyamide from ARKEMA Technical Polymers
[24]Trogamid ® T5000 is a transparent polyamide from EVONIK Industries.
[25]Surlyn ® 7940 (Li) and Surlyn ® 8940 (Na), are medium acid, monovalent and medium flow ionomers.
[26]Methylene diphenyl diisocyanate.
[27]Polytetramethylene ether glycol.
[28]Ethacure 300, dimethylthiotoluene diamine, sold by Albemarle.

Referring to golf balls Ex. 5, Ex. 6, Ex. 7, and Ex. 8 of TABLE IV, each dual core comprises a very soft inner core layer surrounded by a much harder outer core layer. Each inner core layer has a diameter of less than 1.10 inches, is formed from an unfoamed thermoplastic composition, and has a center Shore C hardness of 50 or less. Meanwhile, each outer core layer has a thickness of 0.200 inches or greater, is formed from a second thermoplastic composition comprising a transparent or plasticized polyamide, and has an outer surface Shore D hardness of 55 or greater. Finally, in each of the dual cores of golf balls Ex. 5, Ex. 6, Ex. 7, and Ex. 8, the Shore D hardness of the outer surface, plus 30, is greater than the center Shore C hardness by at least 40.

Specifically referring to golf ball Ex. 5, the EVA inner core layer has a diameter of 0.75 in., and has a center Shore C hardness of 27.1, which is less than 50. The outer core layer meanwhile has a thickness of 0.400 in., is formed from Grilamid TR90, and has an outer surface Shore D hardness of 82.7. The Shore D hardness of the outer surface, plus 30, is therefore greater than the center Shore C hardness by at least 40 (namely ((82.7+30)−27.1)≥40).

In golf ball Ex. 6, the inner core layer is formed from an olefin-unsaturated carboxylic acid ester terpolymer, has a diameter of 0.50 in., and has a center Shore C hardness of 48.1, which is less than 50. The outer core layer meanwhile has a thickness of 0.525 in., is formed from Rilsan Clear G350, and has an outer surface Shore D hardness of 79.6. The Shore D hardness of the outer surface, plus 30, is therefore greater than the center Shore C hardness by at least 40 (namely 479.6+30)−48.1)≥40).

Golf ball Ex. 7 has an inner core layer that is formed from a styrene block copolymer, has a diameter of 0.75 in., and has a center Shore C hardness of 42.8, which is less than 50. The outer core layer meanwhile has a thickness of 0.400 in., is formed from Pebax Clear 400, and has an outer surface Shore D hardness of 62.3. The Shore D hardness of the outer surface, plus 30, is therefore greater than the center Shore C hardness by at least 40 (namely((62.3+30)−36.4)>40).

Finally, in golf ball Ex. 8, the inner core layer is formed from a thermoplastic polyester elastomer, has a diameter of 0.50 in., and has a center Shore C hardness of 42.8, which is less than 50. The outer core layer meanwhile has a thickness of 0.525 in., is formed from Trogamid® T5000, and has an outer surface Shore D hardness of 87.0. The Shore D hardness of the outer surface, plus 30, is therefore greater than the center Shore C hardness by at least 40 (namely ((87.0+30)−42.8)>40, respectively).

In contrast to golf balls Ex. 5, Ex. 6, Ex. 7, and Ex. 8, comparative golf ball Comp. Ex. 1 incorporates an inner core layer and an outer core layer that are formed from conventional thermoset rubber-based compositions. The inner core layer of Comp. Ex. 1 has a diameter of 1.0 in. and the outer core layer has a thickness of 0.275 in., but the center Shore C hardness well above 50 (namely 71). Meanwhile, the outer core layer of Comp. Ex. 1 has an outer surface Shore D hardness of 60.1, which plus 30, is greater than the center Shore C hardness by only 19.1, well below "at least 40" of golf balls of the invention.

Accordingly, each of golf balls Ex. 5, Ex. 6, Ex. 7, and Ex. 8 incorporates a core having a steep positive hardness gradient progressing from a hard core outer surface to a very soft center, whereas the core of golf ball Comp. Ex. 1 has a center Shore C hardness above 50 and an outer surface Shore D hardness, plus 30, that is not greater than the center Shore C hardness by "at least 40". Golf balls of the invention incorporating cores such as depicted in golf balls Ex. 5, Ex. 6, Ex. 7, and Ex. 8 produce a desired spin profile of reduced spin off the driver meanwhile maintaining moderate spin off wedges and irons.

Embodiments are also envisioned wherein golf balls Ex. 5, Ex. 6, Ex. 7, and Ex. 8 further include and intermediate core layer between inner core layer $TP_1$ and outer core layer $TP_2$. In such an embodiment, the intermediate core layers of golf balls Ex. 5, Ex. 6, Ex. 7, and Ex. 8 may be formulated as set forth in TABLE V below, namely the same formulations as used for the outer core layers of golf balls Ex. 1, Ex. 2, Ex. 3, and Ex. 4 of TABLE III:

TABLE V

| Ingredients | OPTIONAL INTERMEDIATE CORE LAYER MATERIALS | | | |
| --- | --- | --- | --- | --- |
| (Phr) | Ex. 5 | Ex. 6 | Ex. 7 | Ex. 8 |
| Primacor ® 5980I[1] | 43 | 48 | 48 | 47 |
| Fusabond ® N525[2] | 11 | * | 12 | * |
| Elvaloy ® AC 3427[3] | * | * | * | 13 |
| Kraton FG1924 G[4] | * | 12 | * | * |
| Ethyl Oleate | 10 | * | * | * |
| Oleic Acid | 36 | 40 | 40 | 40 |
| Mg(OH)$_2$ | 8.0 | 8.9 | 8.9 | 8.8 |

[1]Primacor ® 5980I is an Ethylene/-Acrylic Acid Copolymer available from Dow Chemical Company.
[2]Fusabond ® N525 is an anhydride modified ethylene copolymer available from E.I. du Pont de Nemours and Company, Inc.
[3]Elvaloy ® AC 3427 is a copolymer of ethylene and butyl acrylate available from E.I. du Pont de Nemours and Company, Inc.
[4]Kraton FG1924 G is a linear tribiock copolymer based on styrene and ethylene/butylene with a polystyrene content of 13% (Styrene block copolymer) available from Kraton Polymers.

In one alternative embodiment, the Shore D hardness of the outer surface, plus 30, is greater than the center Shore C hardness by at least 45. In another embodiment, the Shore D hardness of the outer surface, plus 30, is greater than the center Shore C hardness by at least 50. In yet another embodiment, the Shore D hardness of the outer surface, plus 30, is greater than the center Shore C hardness by at least 55. In yet another embodiment, the Shore D hardness of the outer surface, plus 30, is greater than the center Shore C hardness by at least 60. In yet another embodiment, the Shore D hardness of the outer surface, plus 30, is greater than the center Shore C hardness by at least 65.

The optional intermediate core layers, being disposed between the inner core layer and outer core layer, may have an individual layer thickness within a range of from 0.005 inch to 0.250 or inch, or from about 0.010 inch to about 0.200 inch, or from about 0.030 inch to about 0.150 inch, or from about 0.060 inch to about 0.090 inch. An intermediate core layer may have a hardness in the range of from about 10 Shore C to about 90 Shore C. In an additional non-limiting example, the intermediate layer may be formed from an HNP composition.

The multilayer core may have an overall diameter of from about 1.0 inch to about 1.64 inches.

The inner core layer may have a compression of 40 or less. In one embodiment, the inner core layer may have a compression of 0 or less.

Meanwhile, the core may an overall compression of from about 50 to about 110.

The inner core layer has a coefficient of restitution ("COR") at 125 ft/s of 0.780 or less, or 0.650 or less, or 0.600 or less, or 0.550 or less, and the multilayer core has an overall COR of 0.795 or greater, or 0.800 or greater, or 0.810 or greater, or 0.815 or greater, or 0.820 or greater.

Golf balls of the present invention typically have a COR of 0.700 or greater, preferably 0.750 or greater, and more preferably 0.780 or greater. Golf balls of the present invention typically have a compression of 40 or greater, or a compression within a range having a lower limit of 50 or 60 and an upper limit of 100 or 120.

In one embodiment, a golf ball of the invention incorporates an intermediate layer (or inner cover layer) between the core and the cover (or between the core and outer cover layer). In such an embodiment, the intermediate layer or inner cover layer, formed about the core, has a surface hardness of from about 50 Shore D to about 80 Shore D.

The finished golf ball has a compression that is greater than a compression of the inner core layer and outer core layer, combined. In one embodiment, the compression of the finished golf ball is greater than the compression of the inner core layer and outer core layer, combined, by at least 10%. In another embodiment, the compression of the finished golf ball is greater than the compression of the inner core layer and outer core layer, combined, by at least 15%. In yet another embodiment, the compression of the finished golf ball is greater than the compression of the inner core layer and outer core layer, combined, by at least 20%, or by at least 30%, or by at least 40%, or by at least 50%, or by about 60% or greater.

It is to be understood that the examples herein are for illustrative purposes only, and in no manner meant to limit the present invention.

FIG. 1 herein depicts interface hardnesses for the inner core layer and an outer core layer in one embodiment of a golf ball of the invention. Referring to FIG. 1, the interface hardnesses for each of the inner core layer and outer core layer may be extrapolated from the curve produced by having made hardness measurements on the cross-section of the core or ball radially outward from the center in about 2 mm increments. In FIG. 1, the hardness results are plotted as a function of distance from the core center (mm). As shown in FIG. 1, the center hardness is 48 Shore C, the outer surface hardness is 88 Shore C, and meanwhile, the inner core layer interface hardness is 49 Shore C, and the outer core layer interface hardness is 73 Shore C.

Figure 2:
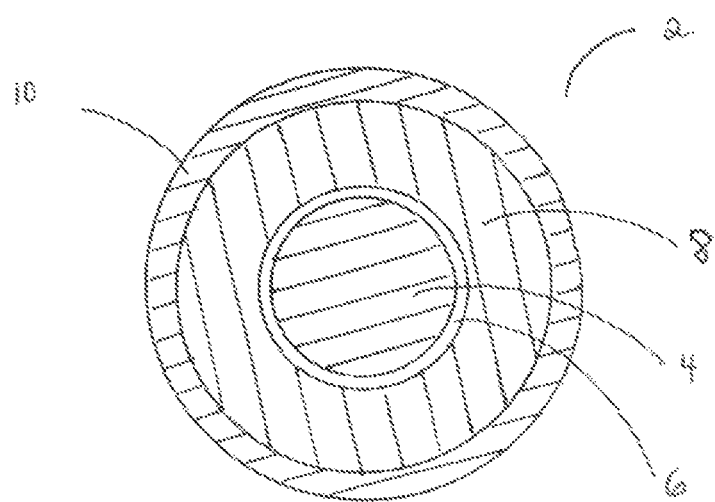
FIG. 2 depicts a side view of a golf ball according to one embodiment of the invention as detailed herein below.

FIG. 2 illustrates one embodiment of a golf ball of the invention wherein golf ball 2 comprises solid inner core layer 4 formed from a first unfoamed thermoplastic composition $TP_1$ and having a diameter of 1.10 inch or less and a center Shore C hardness ($H_{center}$) of 15 or less; an intermediate core layer 6; an outer core layer 8 formed from a second thermoplastic composition $TP_2$ comprising at least one transparent or plasticized polyamide and having a thickness of greater than 0.40 inches and an outer surface Shore C hardness ($H_{outer\ surface}$) of 55 or greater; and a cover 10 formed about the core.

In a golf ball of the invention, the solid inner core layer is formed from an unfoamed composition selected from thermoplastic compositions that can be formulated to provide a very soft, low compression center. Non-limiting examples of suitable inner core layer materials include Riteflex®425, Pebax® 2533 SA 01, Pebax® Rnew 25R53 SP 01, Kraton® D0243 B, Kraton® D1101 A, Kraton® D1101 B, Kraton® D1101 K, Kraton® D1102 K, Kraton® D1118 B, Estane® S180A TPU, Estane® S385A TPU, Estane T370A TPU, Estane® UB400 TPU, Fusbond® 525D, Fusbond® C190, Nucrel® 9-1, Elvax® 260, Elvax® 240W, Elvax® 150, and Elvax® 40W.

Thermoplastic compositions suitable for forming the inner core layer and/or outer core layer include ionomers; non-ionomeric acid polymers, such as E/Y- and E/X/Y-type copolymers, wherein E is an α-olefin (e.g., ethylene), Y is a carboxylic acid such as acrylic, methacrylic, crotonic, maleic, fumaric, or itaconic acid, and X is a softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations of any two or more of the above thermoplastic polymers.

Ionomers, including partially neutralized ionomers and highly neutralized ionomers (HNPs), and ionomers formed from blends of two or more partially neutralized ionomers, blends of two or more highly neutralized ionomers, and blends of one or more partially neutralized ionomers with one or more highly neutralized ionomers, are particularly suitable for forming the core layers. For purposes of the present disclosure, "HNP" refers to an acid copolymer after at least 80% of all acid groups present in the composition are neutralized. Preferred ionomers are salts of E/X- and E/X/Y-type acid copolymers, wherein E is an α-olefin (e.g., ethylene), X is a $C_3$-$C_8$ α,β-ethylenically unsaturated carboxylic acid, and Y is a softening monomer. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl (meth)acrylates wherein the alkyl groups have from 1 to 8 carbon atoms, including, but not limited to, n-butyl (meth)acrylate, isobutyl (meth)acrylate, methyl (meth)acrylate, and ethyl (meth)acrylate. Particularly preferred E/X/Y-type copolymers are ethylene/(meth) acrylic acid/n-butyl (meth)acrylate, ethylene/(meth) acrylic acid/isobutyl (meth)acrylate, ethylene/(meth) acrylic acid/methyl (meth)acrylate, and ethylene/(meth) acrylic acid/ethyl (meth)acrylate. As used herein, "(meth) acrylic acid" means methacrylic acid and/or acrylic acid. Likewise, "(meth)acrylate" means methacrylate and/or acrylate. The α-olefin is typically present in the acid copolymer in an amount of 15 wt % or greater, or 25 wt % or greater, or 40 wt % or greater, or 60 wt % or greater, based on the total weight of the acid copolymer. The acid is typically present in the acid copolymer in an amount of 6 wt % or greater, or 9 wt % or greater, or 10 wt % or greater, or 11 wt % or greater, or 15 wt % or greater, or 16 wt % or greater, or in an amount within a range having a lower limit of 1 or 4 or 5 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The optional softening monomer is typically present in the acid copolymer in an amount within a range having a lower limit of 0 or 1 or 3 or 5 or 11 or 15 or 20 wt % and an upper limit of 23 or 25 or 30 or 35 or 50 wt %, based on the total weight of the acid copolymer.

The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Suitable ionomers are further disclosed, for example, in U.S. Pat. App. Publ. Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Thermoplastic compositions of the present invention optionally include additive(s) and/or filler(s) in an amount of 50 wt % or less, or 30 wt % or less, or 20 wt % or less, or 15 wt % or less, based on the total weight of the thermoplastic composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), and fillers, such as zinc oxide, tin oxide, barium sulfate, zinc sulfate, calcium oxide, calcium carbonate, zinc carbonate, barium carbonate, tungsten, tungsten carbide, silica, lead silicate, clay, mica, talc, nano-fillers, carbon black, glass flake, milled glass, flock, fibers, and mixtures thereof. Suitable additives are more fully described in, for example, U.S. Pat. App. Publ. No. 2003/0225197, the entire disclosure of which is hereby incorporated herein by reference. In a particular embodiment, the total amount of additive(s) and filler(s) present in the thermoplastic composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the thermoplastic composition, and an upper limit of 9 or 10 or 12 or 15 or 20 wt %, based on the total weight of the thermoplastic composition. In a particular aspect of this embodiment, the thermoplastic composition includes filler(s) selected from carbon black, micro- and nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

Examples of commercially available thermoplastics suitable for forming the inner core layer include, but are not limited to, Surlyn® ionomer resins, Hytrel® thermoplastic polyester elastomers, ionomeric materials sold under the trade names DuPont® HPF 1000 and HPF 2000, Nucrel® acid copolymer resins, Fusabond® metallocene-catalyzed polyethylenes, Fusabond® functionalized ethylene acrylate copolymers, Fusabond® functionalized ethylene vinyl acetate copolymers, Fusabond® anhydride modified HDPEs, Fusabond® random ethylene copolymers, Fusabond® chemically modified ethylene elastomers, and Fusabond® functionalized polypropylenes, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; Pebax® thermoplastic polyether and polyester amides, Lotader® ethylene/acrylic ester/maleic anhydride random terpolymers and Lotader® ethylene/ethyl acrylate/maleic anhydride random terpolymers, all of which are commercially available from Arkema Inc.; Kraton® linear triblock copolymers based on styrene and ethylene/butylene, commercially available from Kraton Performance Polymers Inc.; and Riteflex® polyester elastomers, commercially available from Ticona.

The thermoplastic inner and outer core layers of a golf ball of the invention are formulated to have properties that differ as disclosed herein. Non-limiting examples of suitable materials for an inner core layer and outer core layer of a golf ball of the invention appear in TABLE III and TABLE IV (along with TABLE I) and elsewhere herein.

TABLE IV includes prophetic golf ball constructions wherein the different thermoplastic material of outer core layer is formed from transparent polyamides. Thermoplastic transparent polyamides may be used to form the outer core compositions of golf balls of this invention. The transparent polyamide by itself, may comprise a homopolymer, copolymers including block copolymer, or a blend or alloy thereof. In one preferred embodiment, the composition further comprises an acid anhydride-modified polyolefin and/or plasticizer as discussed below.

The term, "polymer" refers to, but is not limited to, oligomers, homopolymers, copolymers, terpolymers, and the like. The polymers may have various structures including, but not limited to, regular, irregular, alternating, periodic, random, block, graft, linear, branched, isotactic, syndiotactic, atactic, and the like. Polyamide polymers include, but are not limited to, polyamide copolymers (copolyamides) having two types of monomers, copolymers having three types of monomers, and copolymers having more than three types of monomers. Blends and alloys of polyamides also may be made in accordance with this invention as described further below.

In general, transparent polyamides are classified as having a microcrystalline structure or amorphous structure. Both microcrystalline and amorphous transparent polyamides may be used in the present invention. It should be understood that while a transparent polyamide is preferably included in the composition, the final composition may have a transparent, translucent, or opaque optical nature. That is, the final composition may contain various additives including fillers, coloring agents, dyes, pigments, and the like that effect the optical nature of the composition. By the term, "translucent," as used herein, it is meant having a light transmission of greater than 1 percent per the test procedures, ASTM D1003, using an Illuminate C light source. Alternatively, the polyamide composition has a transparency of at least about 50%, and more preferably within a range having a lower limit of about 50% or 55% or 60% or 65% or 70% and an upper limit of about 75% or 80% or 85% or 90% or 95% or greater as measured by ISO 13468-1,2 using a 2 mm thick sample measured at a wavelength of 560 nm.

Examples of commercially available transparent polyamide polymers that are suitable for use in an outer core layer of a golf ball of the invention include the following: copolyamides such as Platamid® 8020; semi-aromatic transparent polyamides such as Rilsan® Clear G170; transparent polyamides such as Rilsan® G120 Rnew; Rilsan®G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. (King of Prussia, Pa.), may be used. Other suitable examples include Ultramid® polyamides, available from BASF; and Zytel and Dartek nylon resins, available from DuPont. EMS-Chemie AG (Domat/EMS, Switzerland) supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention.

Other suitable polyamides include for example Trogamid® and Vestamid® grades available from DeGussa AG (Marl, Germany); Kopa® grades available from Kolon; Dureathan® grades available from Lanxess AG (Cologne, Germany); Arlen® grades available from Mitsui (Japan); transparent amorphous nylons such as Ashlene® D870 and D870L available from Ashley Polymers (Brooklyn, N.Y.); Radici Radilon® CST copolyamides (Italy); Shakespeare Isocor® CN30XT and CN30BT nylon 610 resins (Shakespeare Engineered Nylons owned by Jarden Applied Materials, Columbia, S.C.), Toyobo Glamide® T-714E nylons (Japan); and TP Composites Elastoblend® PA12 CL nylons (Aston, Pa.). Transparent polyamides including, but not limited to, polyether-amide, polyester-amide, polyether-ester-amide block copolymers, are particularly suitable for use in the invention herein, and more particularly, the transparent polyamide copolymers, Rilsan Clear G300 HI, Pebax Clear 300, and Pebax Clear 400 available from Arkema, Inc. (King of Prussia, Pa.) are particularly effective.

Meanwhile, examples of suitable transparent homopolyamides and copolyamides, which are amorphous or exhibit a slight crystallinity, are described in U.S. Pat. App. Publ. No. 2010/0140846; U.S. Pat. No. 6,376,037 to Montanari et al.; and U.S. Pat. No. 8,399,557 to Montanari et al., the entire disclosures of which are hereby incorporated herein by reference. Also, suitable amorphous transparent or translucent polyamides that may be formed from the condensation of diamines with dicarboxylic acids or lactams; and blends or alloys of two or more different polyamides, are described in U.S. Pat. App. Publ. No. 2012/0223453, the entire disclosure of which is hereby incorporated herein by reference.

Additionally, suitable polyamide copolymers such as a copolymers containing polyether blocks and polyamide blocks are described in U.S. Pat. App. Publ. No. 2013/0202831 ("831 Publ."), the entire disclosure of which is hereby incorporated by reference. The polyamide copolymers described in the '831 Publ. have the following properties: are resistant to a high-velocity impact of at least 76.2 m/s (250 ft/s) according to the EN 166 standard; have a Charpy notched impact strength of at least 90 kJ/m² according to the ISO 179 leU standard; preferably also have a chemical resistance such that it is capable of deforming, in flexion, by immersion in a solvent according to the ISO 22088-3 standard by at least 3% without breaking; are light, having a density of less than 1.05 g/cm³ measured according to the ISO 1183 D standard; and are flexible and have an elastic modulus of less than 1000 MPa, preferably of less than 800 MPa, measured according to the ISO 527-2:93-1BA standard.

Suitable transparent polyamides are further described in U.S. Pat. No. 6,528,560 to Bühler; U.S. Pat. No. 6,831,136 to Torre et al.; U.S. Pat. No. 6,943,231 to Bühler; U.S. Pat. No. 8,309,643 to Thullen et al.; U.S. Pat. No. 8,507,598 to Bühler; and U.S. Pat. App. Publ. No. 2010/0203275, the entire disclosures of which are hereby incorporated herein by reference.

In general, polyamides refer to high molecular weight polymers in which amide linkages (—CONH—) occur along the length of the molecular chain (*Hawley's Condensed Chemical Dictionary*, 13$^{th}$ Ed.). Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 6,6; nylon 6,10; nylon 11, and nylon 12. Aliphatic and aromatic polyamides and blends thereof may be prepared in accordance with this invention.

In general, polyamide homopolymers and copolymers are suitable for use in this invention. The specific monomers, reaction conditions, and other factors will be selected based on the desired polyamide polymer to be produced. There are two common methods for producing polyamide homopolymers. In a first method, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. For example, nylon 6 is a homopolymer of caprolactam, that is, polycaprolactam. The second method involves the condensation polymerization of a dibasic acid and a diamine. In general, this reaction takes place as follows:

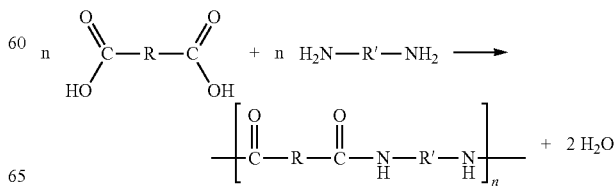

Conventional polyamides are commonly designated as nylon 4,6; nylon 6,6; nylon 6,9; nylon 6,10; nylon 6,12; and the like, where the first number indicates the number of carbon atoms connecting the two amine groups in the diamine and the second number indicates the number of carbon atoms connecting the two acid groups in the dibasic acid, including those in the acid groups. For example, nylon 6,6 is the reaction product of hexamethylenediamine and adipic acid.

Other suitable polyamides include nylon 4, nylon 7, nylon 13, nylon 12,12; nylon 13,13; and mixtures/blends thereof with suitable polyamides. Still other polyamides include nylon 6/66; and nylon 6/69 and mixtures/blends thereof with suitable polyamides. Polyamide compositions having mechanical properties that do not significantly change after the composition has been exposed to moisture are particularly effective.

As noted above, transparent polyamides are particularly suitable for use in the invention herein. Such transparent polyamides include transparent polyamide copolymers (co-polyamides). For example, polyether-amide and polyester-amide block copolymers may be used. Such polyamide copolymers are described, for example, in the above-mentioned U.S. Pat. App. Publ. No. 2010/0140846 and U.S. Pat. Nos. 6,376,037 and 8,399,557, the entire disclosures of which are hereby incorporated herein by reference. It should be understood that the term, "polyamide" as used in the present invention, is meant to include copolymers with polyamide blocks and polyether blocks, i.e., polyether block amide polymers, and the mixtures of these copolymers with the preceding polyamides. Polymers with polyamide blocks and polyether blocks result from the copolycondensation of polyamide sequences comprising reactive ends with polyether sequences comprising reactive ends, such as, inter alia:

a) polyamide sequences comprising diamine chain ends with polyoxyalkylene sequences comprising dicarboxylic chain ends, b) polyamide sequences comprising dicarboxylic chain ends with polyoxyalkylene sequences comprising diamine chain ends obtained by cyanoethylation and hydrogenation of α'Ω-dihydroxylated aliphatic polyoxyalkylene sequences, known as polyetherdiols, c) polyamide sequences comprising dicarboxylic chain ends with polyetherdiols, the products obtained being, in this specific case, polyetheresteramides.

These polymers with polyamide blocks and polyether blocks, whether they originate from the copolycondensation of polyamide and polyether sequences prepared beforehand or from a one-stage reaction, exhibit, for example, Shore D hardnesses which can be from 20 to 95 and advantageously between 25 and 85, more preferably 30 to 80, and even more preferably 35 to 78 and an intrinsic viscosity between 0.8 and 2.5, measured in meta-cresol at 25° C.

Whether the polyester blocks derive from polyethylene glycol, polyoxypropylene glycol or polyoxytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units. Polymers with polyamide and polyether blocks are disclosed in U.S. Pat. Nos. 4,331,786, 4,115,475, 4,195,015, 4,839,441, 4,864,014, 4,230,838 and 4,332,920, the entire disclosures of which are hereby incorporated herein by reference. The polyether can be, for example, a polyethylene glycol (PEG), a polypropylene glycol (PPG) or a polytetramethylene glycol (PTMG). The latter is also known as polytetrahydrofuran (PTHF).

Blends of polyamides also may be used in accordance with this invention. For example, a blend of transparent polyamides or a blend of transparent and non-transparent polyamides may be used in accordance with this invention. In particular, a blend of transparent polyamide and a thermoplastic polyamide elastomer (typically a copolymer of polyamide and polyester/polyether) may be used. The polyamide elastomer may be transparent or non-transparent. Many polyamide elastomers comprise a hard polyamide segment (for example, nylon 6, nylon 6,6; nylon 11, nylon 12 and the like) and a polyether or polyester as a soft segment. Suitable polyamide elastomers that can be used to form the compositions of this invention include, for example. polyether-amide block copolymers, available from Arkema, Inc. (Columbs, France) as Pebax® resins. In general, these block copolymers have thermoplastic properties (softens when exposed to heat and returns to original condition when cooled) properties and elastomeric properties (can be stretched and then returns to a near original condition when released) properties. The ratio of hard to soft segments and the length, sequence, and like of the segments are significant factors in determining the properties of the resulting block copolymer.

One advantageous property of the transparent polyamides used to form the compositions of the present invention is that they exhibit a relatively high glass transition temperature. The transparent polyamides are relatively easy to process and can be molded to form different golf ball layers. In general, the glass-liquid transition refers to the reversible transition in amorphous materials (or in the amorphous regions within semi-crystalline materials) from a hard and relatively brittle state into a molten or state. The glass transition temperature ($T_g$) as reported herein is measured according to Test Method ISO 11357 and reported in degrees celsius. As the temperature of a polymer drops below $T_g$, it behaves in an increasingly brittle manner. As the temperature rises above the $T_g$, the polymer becomes more rubber-like. Thus, knowledge of $T_g$ is an important factor in the selection of materials for golf ball layer applications. In general, values of $T_g$ well below room temperature define the domain of elastomers and values above room temperature define rigid, structural polymers. It has been found that preferred transparent polyamides exhibit a $T_g$ in a range of about 30 to about 170° C., and has a lower range of about 35° C. or 40 T or 50 T or 60 C and an upper range of about 70° C. or 80° C. or 90° C. or 120° C. or 140° C. or or 150° C. In one preferred version, the $T_g$ may be about 65° C., 75° C., 85° C., 91° C., 95° C. or 105° C.

It is important to note that these preferred transparent polyamides may also have a second $T_g$ that is observed at below ambient temperatures (less than 25° C.). It is believed that this sub-ambient $T_g$ is associated with a relatively soft polyether segment; whereas, the higher temperature $T_g$ is associated with a polyamide segment. Therefore, in one embodiment, a transparent polyamide having a reported $T_g$ of 90° C. may or may not also exhibit a $T_g$ at −65° C., and the like. In one embodiment, the transparent polyamide has a glass transition temperature in the range of about 75° to about 160° C., more preferably in the range of about 80° to about 95° C.

As used herein, the term, "semi-crystalline" covers (co) polyamides which have both a glass transition temperature $T_g$ and a melting point as determined by DSC. The term, "amorphous" covers polyamides that do not have a melting point detected by DSC or a melting point with negligible intensity such that it does not affect the essentially amorphous nature of the polymer. The term, "semi-crystalline", as used herein, relates to polymers that have both a melting exotherm and a glass transition as determined by DSC. The term, "amorphous", as used herein, relates to polymers that have a glass transition but do not exhibit a are essentially amorphous and exhibit a glass transition and a small or insignificant melting exotherm ($DH_f \leq 10$ J/g) as determined by DSC. The term, "micro-crystalline", as used herein, refers to semi-crystalline polymers in which melting exotherm as determined by DSC. The term, "quasi-amorphous", as used herein, relates to polymers that the spherulite size is sufficiently small in order to maintain transparency.

The transparent polyamides also have high flexibility, toughness, impact-durability and stress-crack resistance. One advantageous property of the transparent polyamides used to form the compositions of the present invention is their relatively high Charpy impact-resistance. In general, impact testing refers to the energy required to break or deform a material. The Charpy impact test is a standardized high strain-rate test which determines the amount of energy absorbed by a material during fracture. This absorbed energy is a measure of a given material's notch toughness and acts as a tool to study temperature-dependent ductile-brittle transition. The test method standard is ISO 179/1eA. Samples are conditioned for 15 days at 23° C. and 50% relative humidity. The test results herein are measured at either 23° C. or -30° C. and results are reported in kilojoules per meter squared. The higher the number, the tougher the material, with a no-break (NB) meaning that the test sample was flexible enough to withstand the impact without fracturing. High Charpy impact values are an important material property to consider when choosing a material for a layer in a golf ball, since a golf ball must withstand very high force impacts, such as those encountered when struck with a golf club. It is believed that the polyamide compositions herein comprising a transparent polyamide, preferably have a Charpy notched impact (at 23° C.) of from at least about 8 to No-Break (NB), and have a lower range of from about 10 or 15 or 20 or 25 or 30 or or 35 or 40 kJ/m$^2$ to an upper limit ranging from about 80, 85, 90, or 95 kJ/m$^2$ to no-break. A preferred transparent polyamide composition comprises Rilsan Clear G300 HI, which has a Charpy notched impact value at 23° C. of 94 kJ/m$^2$, and a value at -30° C. of 19 kJ/m$^2$.

The polyamide compositions of this invention may further contain acid anhydride-modified polyolefins. Adding the acid anhydride-modified polyolefin helps improve the toughness and impact durability of the composition. In such materials, the polyolefin polymer is chemically modified with acid anhydride. That is, the polyolefin polymer is functionalized; it contains at least one acid anhydride group. In general, such acid anhydride groups may be grafted onto the polyolefin polymer backbone. Some examples of suitable acid anhydrides that may be used to functionalize the polyolefin include, but are not limited to, fumaric, nadic, itaconic, and clorendic anhydrides, and their substituted derivatives thereof.

Suitable olefin monomeric units that can be used to prepare the polyolefin polymer include, for example, ethylene, propylene, butene, hexene, heptene, octene, decene, and dodecene. Preferably, the monomeric unit contains from 2 to about 20 carbon atoms. The resulting polyolefin chains (polymer backbones) formed from these monomeric units include, for example, polyethylene, high density polyethylene (HDPE), low density polyethylene (LDPE), very low density polyethylene (VLDPE), polypropylene, polybutene, polyhexene, polyoctene, polydecene, and polydodecene, and copolymers and blends thereof. The resulting polyolefin polymer is functionalized with at least one acid anhydride moiety. More particularly, the acid anhydride-modified polyolefin polymers used in this invention include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like.

Other polyolefin-based copolymers such as polypropylene and polybutene-based copolymers also can be used. These copolymers include random, block, and graft copolymers which have been functionalized with acid anhydride groups. Examples of commercially-available acid anhydride polyolefins that can be used in accordance with this invention, include, but are not limited to, Amplify™ GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Addivant.; and Exxelor polymers available from the ExxonMobil Corp.

Various polyamide compositions may be made in accordance with this invention. The composition may optionally contain an acid anhydride-modified polyolefin, plasticizer, fatty acid salt, fatty acid amide, fatty acid ester, and mixtures thereof. The resulting polyamide composition may be used to prepare a golf ball component (for example, core, casing, or cover layer) having several advantageous properties. As noted above, it is significant that a blend comprising transparent polyamide and acid anhydride-modified polyolefin may be prepared and the resulting composition has excellent properties, particularly suitable for making golf ball layers. For example, a blend of 90% Grivory™ GTR45 transparent polyamide and 10% Fusabond™ N525 acid anhydride-modified polyolefin may be prepared and the resulting composition (solid, transparent sphere) has a COR of 0.784, Atti Compression of 182, and Shore D surface hardness of 81.8. In another example, a blend of 50% Grivory™ GTR45 transparent polyamide and 50% Fusabond™ N525 acid anhydride-modified polyolefin may be prepared and the resulting composition (solid, transparent sphere) has a COR of 0.633, Atti Compression of 105, and Shore D surface hardness of 56.2.

In other embodiments, it is not necessary for the polyamide to be blended with an acid anhydride-modified polyolefin or any other polymer or non-polymer material. That is, the composition may consist entirely of the transparent polyamide (that is, 100% by weight polyamide). In other instances, the composition may consist essentially of the transparent polyamide (for example, 97 to 100% by weight polyamide). Such polyamide compositions may contain other ingredients that do not materially affect the basic and novel characteristics of the composition. For example, mineral fillers may be added as discussed further below. In one particular version, the composition consists essentially of transparent polyether-amide block copolymer such as the above-mentioned Rilsan G300 HI, Pebax Clear 300, or Pebax Clear 400 (Arkema, Inc.).

In one embodiment, the polyamide compositions of the outer core layer further contain a plasticizer. Adding the plasticizers to the composition helps to reduce the glass transition temperature ($T_g$) of the composition. The glass transition in a polymer is a temperature range below which a polymer is relatively brittle and above which it is rubber-like. In addition to lowering the $T_g$, the plasticizer may also reduce the tan δ in the temperature range above the $T_g$. A polymer's $T_g$ is measured by a Differential Scanning calorimeter or a Dynamic Mechanical Analyzer (DMA) and the DMA is used to measure tan δ. The plasticizer may also reduce the hardness and compression of the composition when compared to its non-plasticized_condition. Adding the plasticizers to the composition also helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

The polyamide compositions may contain one or more plasticizers. The plasticizers that may be used in the polyamide compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate are suitable. Iso- and terephthalates such as Dioctyl terephthalate and Dinonyl isophthalate may be used. Also appropriate are trimellitates such as Trimethyl trimellitate (TMTM), Tri-(2-ethylhexyl) trimellitate (TOTM), Tri-(n-octyl,n-decyl) trimellitate, Tri-(heptyl,nonyl) trimellitate, Tri-n-octyl trimellitate; as well as benzoates, including: 2-ethylhexyl-4-hydroxy benzoate, n-octyl benzoate, methyl benzoate, and ethyl benzoate.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS). Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Methyl oleate, ethyl oleate, butyl oleat, 2-ethylhexyl oleate, octyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as Tricresyl phosphate (TCP), Tributyl phosphate(TBP), alkyl sulfonic acid phenyl esters (ASE); and sulfonamides such as N-ethyl toluene sulfonamide,N-(2-hydroxypropyl) benzene sulfonamide, N-(n-butyl) benzene sulfonamide. Furthermore, thioester and thioether variants of the plasticizer compounds mentioned above are suitable. Non-ester plasticizers such as alcohols, polyhydric alcohols, glycols, polyglycols, and polyethers are suitable materials for plasticization. Materials such as polytetramethylene ether glycol, poly(ethylene glycol), and poly(propylene glycol), oleyl alchohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of polyamide plasticizers that may be used in the composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

U.S. Pat. No. 7,045,185 to Jacques et al., the entire disclosure of which is hereby incorporated herein by reference, discloses suitable plasticizers: sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid.

Sulfonamides are particularly preferred plasticizers for use in the present invention as described, for example, in U.S. Pat. No. 7,297,737 to Fish, Jr. et al., the entire disclosure of which is hereby incorporated herein by reference. Examples of such sulfonamides include N-alkyl benzenesulfonamides and toluenesulfonamides, particularly N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., U.S. Pat. App. Publ. No. 2010/0183837, the entire disclosure of which is hereby incorporated herein by reference. The polyamide compositions containing plasticizer, as described in the above patent references, also may be used in this invention.

An optional core intermediate layer may in one embodiment be made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation.

The degree of cross linking of the rubber may be increased by increasing the amount (phr) of peroxide added. Meanwhile, zinc diacrylate is a coagent commonly used with peroxide to increase the state of cure, to take part in the cross-linking of polybutadiene. A small amount of ZDA and/or ZDMA produces a golf ball core with lower initial velocity and lower compression than a larger amount of coagent. The use of ZDA coagent may increase velocity and hardness and contribute to a hard feel. Thus, the amount of peroxide initiator and coagent can be varied to achieve a desired hardness. Antioxidants are compounds that inhibit or prevent the oxidative breakdown of elastomers, and/or inhibit or prevent reactions that are promoted by oxygen radicals.

Other ingredients that are known to those skilled in the art may be used, and are understood to include, but not be limited to, density-adjusting fillers, process aides, plasticizers, blowing or foaming agents, sulfur accelerators, and/or non-peroxide radical sources. The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%. Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; BUDENE 1208, 1207, commercially available from Goodyear of Akron, Ohio; and CB BUNA® 1203G1, 1220, and 1221, commercially available from LANXESS Corporation; Europrene® NEOCIS BR 40 and BR 60, commercially available from Polimeri Europa; and BR 01, BR 730, BR 735, BR 11, and BR 51, commercially available from Japan Synthetic Rubber Co., Ltd; and KARBOCHEM® ND40, ND45, and ND60, commercially available from Karbochem.

The base rubber may also comprise high or medium Mooney viscosity rubber, or blends thereof. A "Mooney" unit is a unit used to measure the resistance to flow of raw or unvulcanized rubber. The viscosity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene adversely interferes with the manufacturing machinery. It is contemplated that polybutadiene with viscosity less than 65 Mooney can be used with the present invention.

In one embodiment of the present invention, golf ball cores made with mid- to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid- to high-Mooney viscosity polybutadiene include LANXESS CB23 (Nd-catalyzed), which has a Mooney viscosity of around 50 and is a highly linear polybutadiene. If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises an Nd-catalyzed polybutadiene, a non-rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) may also be used to modify the properties of the core layers, or the uncured core layer stock by blending with the base thermoset rubber. These TPEs include styrenic block copolymers, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy) diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40 C and DICUP™ 40KE) available from ARKEMA. Similar initiating agents are available from AkroChem, Lanxess, Flexsys/Harwick and R. T. Vanderbilt. Another commercially-available and preferred initiating agent is TRIGONOX 265-50B from Akzo Nobel, which is a mixture of 1,1-di(t-butylperoxy)-3,3,5-trimethylcyclohexane and di(2-t-butylperoxyisopropyl) benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Cray Valley. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R. T. Vanderbilt. Other polyphenolic antioxidants include VANOX® T, VANOX®L, VANOX® SKT, VANOX® SWP, VANOX® 13 and VANOX® 1290.

Suitable antioxidants include, but are not limited to, alkylene-bis-alkyl substituted cresols, such as 4,4'-methylene-bis(2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4(decylidene)-bis-(5-ethyl-p-cresol); (2,5-dimethyl-4-hydroxyphenyl) (2-hydroxy-3,5-dimethylphenyl) methane; (2-methyl-4-hydroxy-5-ethylphenyl) (2-ethyl-3-hydroxy-5-methylphenyl) methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl) nonylmethane; (3-methyl-2-hydroxy-6-ethylphenyl)-(2-isopropyl-3-hydroxy-5-methyl-phenyl)cyclohexylmethane; (2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol; 3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol;

2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n-hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis(4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis(2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3,3',5,5'-tetramethylstilbene; 2,2'-isopropylidene bis (4-methyl-6-t-butyl phenol); ethylene bis(beta-naphthol); 1,5-dihydroxy naphthalene; 2,2'-ethylene bis(4-methyl-6-propyl phenol); 4,4'-methylene bis(2-propyl-6-t-butyl phenol); 4,4'-ethylene bis(2-methyl-6-propyl phenol); 2,2'-methylene bis(5-methyl-6-t-butyl phenol); and 4,4'-butylidene bis(6-t-butyl-3-methyl phenol);

Suitable antioxidants further include, but are not limited to, alkylene trisphenols, such as 2,6-bis(2'-hydroxy-3'-t-butyl-5'-methyl benzyl)-4-methyl phenol; 2,6-bis(2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 360° F., or from about 290° F. to about 335° F., or from about 300° F. to about 325° F., or from about 330° F. to about 355° F., and the stock is held at that temperature for at least about 10 minutes to about 30 minutes.

The thermoset rubber composition in a core of the golf ball of the present invention may also include an optional soft and fast agent. As used herein, "soft and fast agent" means any compound or a blend thereof that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

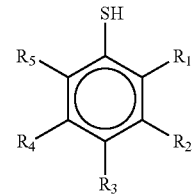

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl) disulfide; bis(2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl) disulfide; bis(2-acetylphenyl) disulfide; bis(4-formylphenyl) disulfide; bis(4-carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphthyl) disulfide; 2,2'-bis(1-acetylnaphthyl) disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 μm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

Without being bound by theory, it is believed that the percentage of double bonds in the trans configuration may be manipulated throughout a core containing at least one main-chain unsaturated rubber (i.e., polybutadiene), plastic, or elastomer resulting in a trans gradient. The trans gradient may be influenced (up or down) by changing the type and amount of cis-to-trans catalyst (or soft-and-fast agent), the type and amount of peroxide, and the type and amount of coagent in the formulation. For example, a formulation containing about 0.25 phr ZnPCTP may have a trans gradient of about 5% across the core whereas a formulation containing about 2 phr ZnPCTP may have a trans gradient of about 10%, or higher. The trans gradient may also be manipulated through the cure times and temperatures. It is believed that lower temperatures and shorter cure times yield lower trans gradients, although a combination of many of these factors may yield gradients of differing and/or opposite directions from that resulting from use of a single factor.

In general, higher and/or faster cure rates tend to yield higher levels of trans content, as do higher concentrations of peroxides, soft-and-fast agents, and, to some extent, ZDA concentration. Even the type of rubber may have an effect on trans levels, with those catalyzed by rare-earth metals, such as Nd, being able to form higher levels of trans polybutadiene compared to those rubbers formed from Group VIII metals, such as Co, Ni, and Li.

The optional intermediate layer(s) are not limited by a particular composition for forming the layer(s), and can be formed from any suitable golf ball composition including, but not limited to, natural rubber; polybutadiene; polyisoprene; ethylene propylene rubber; ethylene-propylene-diene rubber; styrene-butadiene rubber; butyl rubber; halobutyl rubber; thermoset polyurethane; thermoset polyurea; acrylonitrile butadiene rubber; polychloroprene; alkyl acrylate rubber; chlorinated isoprene rubber; acrylonitrile chlorinated isoprene rubber; polyalkenamer rubber; polyester; polyacrylate; partially- and fully-neutralized ionomer; graft copolymer of ionomer and polyamide; polyester, particularly polyesters modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), including, but not limited to, those disclosed in U.S. Pat. Nos. 6,353,050, 6,274,298, and 6,001,930, the entire disclosures of which are hereby incorporated herein by reference; polyamides, polyamide-ethers, and polyamide-esters, including, but not limited to, those disclosed in U.S. Pat. Nos. 6,187,864, 6,001,930, and 5,981,654, the entire disclosures of which are hereby incorporated herein by reference; polyurethanes, polyureas, and polyurethane-polyurea hybrids, including, but not limited to, those disclosed in U.S. Pat. Nos. 5,334,673, 5,484,870, 6,506,851, 6,756,436, 6,835,794, 6,867,279, 6,960,630, and 7,105,623, U.S. Pat. App. Publ. No. 2007/0117923, and U.S. patent application Ser. Nos. 60/401,047 and 13/613,095, the entire disclosures of which are hereby incorporated herein by reference; fluoropolymers, including, but not limited to, those disclosed in U.S. Pat. Nos. 5,691,066, 6,747,110 and 7,009,002, the entire disclosures of which are hereby incorporated herein by reference; non-ionomeric acid polymers, i.e., E/X- and E/X/Y-type copolymers, including, but not limited to, those disclosed in U.S. Pat. No. 6,872,774, the entire disclosure of which is hereby incorporated herein by reference; metallocene-catalyzed polymers, including, but not limited to, those disclosed in U.S. Patent Nos. 6,274,669, 5,919,862, 5,981,654, and 5,703,166, the entire disclosures of which are hereby incorporated herein by reference; polystyrenes, such as poly(styrene-co-maleic anhydride), acrylonitrile-butadiene-styrene, poly(styrene sulfonate), polyethylene styrene; polypropylenes, polyethylenes, propylene elastomers, ethylene elastomers, and copolymers of propylene and ethylene; polyvinyl chlorides; polyvinyl acetates, preferably having less than about 9% of vinyl acetate by weight; polycarbonates, blends of polycarbonate/acrylonitrile-butadiene-styrene, blends of polycarbonate/polyurethane, and blends of polycarbonate/polyester; polyvinyl alcohols; polyethers, such as polyarylene ethers, polyphenylene oxides, and block copolymers of alkenyl aromatics with vinyl aromatics and poly(amic ester)s; polyimides, polyetherketones, and polyamideimides; polycarbonate/polyester copolymers; and combinations of two or more thereof.

Thermoplastic core compositions are optionally treated or admixed with a thermoset diene composition to reduce or prevent flow upon overmolding. Optional treatments may also include the addition of peroxide to the material prior to molding, or a post-molding treatment with, for example, a crosslinking solution, electron beam, gamma radiation, isocyanate or amine solution treatment, or the like. Such treatments may prevent the intermediate layer from melting and flowing or "leaking" out at the mold equator, as thermoset layers are molded thereon at a temperature necessary to crosslink the thermoset layer, which is typically from 280° F. to 360° F. for a period of about 5 to 30 minutes.

The multi-layer core is enclosed with a cover, which may be a single-, dual-, or multi-layer cover, preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover is a single layer having a thickness of from 0.010 or 0.020 or 0.025 inches to 0.035 or 0.040 or 0.050 inches. In another particular embodiment, the cover consists of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

Suitable cover materials include, but are not limited to, polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., (meth)acrylic acid, which do not become part of an ionomeric copolymer; plastomers; flexomers; styrene/butadiene/styrene block copolymers; styrene/ethylene-butylene/styrene block copolymers; polybutadiene; styrene butadiene rubber; ethylene propylene rubber; ethylene propylene diene rubber; dynamically vulcanized elastomers; ethylene vinyl acetates; ethylene (meth)acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan®polyurethanes, commercially available from BASF; synthetic or natural vulcanized rubber; and combinations thereof.

Compositions comprising an ionomer or a blend of two or more ionomers are particularly suitable cover materials. Preferred ionomeric cover compositions include:

(a) a composition comprising a "high acid ionomer" (i.e., having an acid content of greater than 16 wt %), such as Surlyn 8150®;

(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn 8150® and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn 8150®, Surlyn® 8940, and Surlyn® 8140 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, particularly to manipulate product properties. Examples of suitable non-ionic thermoplastic resins include, but are not limited to, polyurethane, polyether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, plyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Polyurethanes, polyureas, and blends and hybrids of polyurethane/polyurea are also particularly suitable for forming cover layers. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Pat. App. Publ. No. 2009/0011868; and U.S. Patent Application Ser. No. 60/401,047, the entire disclosures of which are hereby incorporated herein by reference. Suitable polyurethane-urea cover materials include polyurethane/polyurea blends and copolymers comprising urethane and urea segments, as disclosed in U.S. Pat. App. Publ. No. 2007/0117923, the entire disclosure of which is hereby incorporated herein by reference.

Cover compositions may include one or more filler(s), such as titanium dioxide, barium sulfate, etc., and/or additive(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Suitable cover materials and constructions also include, but are not limited to, those disclosed in U.S. Pat. App. Publ. No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover is a single layer, preferably formed from an ionomeric composition having a material hardness of 60 Shore D or greater or a material hardness of from 60 or 62 or 65 Shore D to 65 or 70 or 72 Shore D, and a thickness of 0.02 inches or greater or 0.03 inches or greater or 0.04 inches or greater or a thickness within a range having a lower limit of 0.010 or 0.015 or 0.020 inches and an upper limit of 0.035 or 0.040 or 0.050 inches.

In another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In another particular embodiment, the cover comprises an inner cover layer formed from an ionomeric composition and an outer cover layer formed from a thermosetting polyurethane- or polyurea-based composition. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover comprises an inner cover layer formed from an ionomeric composition and an outer cover layer formed from a thermoplastic composition selected from ionomer-, polyurethane-, and polyurea-based compositions. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover is a dual- or multi-layer cover including an inner or intermediate cover layer formed from an ionomeric composition and an outer cover layer formed from a polyurethane- or polyurea-based composition. The ionomeric layer preferably has a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic. The outer cover layer composition preferably has a material hardness of 85 Shore C or less, or 45 Shore D or less, or 40 Shore D or less, or from 25 Shore D to 40 Shore D, or from 30 Shore D to 40 Shore D. The outer cover layer preferably has a surface hardness within a range having a lower limit of 20 or 30 or 35 or 40 Shore D and an upper limit of 52 or 58 or 60 or 65 or 70 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches. A moisture vapor barrier layer is optionally employed between the core and the cover.

Moisture vapor barrier layers are further disclosed, for example, in U.S. Pat. Nos. 6,632,147, 6,838,028, 6,932,720, 7,004,854, and 7,182,702, and U.S. Pat. App. Publ. Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Thermoplastic layers herein may be treated in such a manner as to create a positive or negative hardness gradient.

In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

Golf balls of the present invention will typically have dimple coverage of 60% or greater, preferably 65% or greater, and more preferably 75% or greater.

The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is within a range having a lower limit of 1.680 inches and an upper limit of 1.740 or 1.760 or 1.780 or 1.800 inches.

Golf balls of the present invention preferably have a moment of inertia ("MOI") of 70-95 g·cm$^2$, preferably 75-93 g·cm$^2$, and more preferably 76-90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low compression cores will not cause the spring to deflect by more than 1.25 mm and therefore have a zero or negative compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *Compression by Any Other Name, Science and Golf IV, Proceedings of the World Scientific Congress of Golf* (Eric Thain ed., Routledge, 2002).

COR, as used herein, is determined according to a known procedure wherein a sphere is fired from an air cannon at two given velocities and calculated at a velocity of 125 ft/s. Ballistic light screens are located between the air cannon and the steel plate at a fixed distance to measure ball velocity. As the sphere travels toward the steel plate, it activates each light screen, and the time at each light screen is measured. This provides an incoming transit time period inversely proportional to the sphere's incoming velocity. The sphere impacts the steel plate and rebounds through the light screens, which again measures the time period required to transit between the light screens. This provides an outgoing transit time period inversely proportional to the sphere's outgoing velocity. COR is then calculated as the ratio of the outgoing transit time period to the incoming transit time period, $COR=V_{out}/V_{in}=T_{in}/T_{out}$.

The surface hardness of a golf ball layer is obtained from the average of a number of measurements taken from opposing hemispheres, taking care to avoid making measurements on the parting line of the core or on surface defects, such as holes or protrusions. Hardness measurements are made pursuant to ASTM D-2240 using a calibrated, digital durometer, capable of reading to 0.1 hardness units and set to record the maximum hardness reading obtained for each measurement.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

Hardness points should only be measured once at any particular geometric location.

It should be understood that there is a fundamental difference between "material hardness" and "hardness as measured directly on a golf ball." For purposes of the present disclosure, material hardness is measured according to ASTM D2240 and generally involves measuring the hardness of a flat "slab" or "button" formed of the material. Hardness as measured directly on a golf ball (or other spherical surface) typically results in a different hardness value. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a core and a cover, wherein the core consists of:
   a solid inner core layer formed from a first unfoamed thermoplastic composition $TP_1$ and having a diameter of 1.10 inch or less and a center Shore C hardness ($H_{center}$) of 15 or less,
   an intermediate core layer, and
   an outer core layer formed from a second thermoplastic composition $TP_2$ comprising at least one transparent or plasticized polyamide and having a thickness of 0.40 inches or greater and an outer surface Shore D hardness ($H_{outer\ surface}$) of 55 or greater,
   wherein $H_{outer\ surface}+30>H_{center}$, and $H_{outer\ surface}+30-H_{center}>70$.

2. The golf ball of claim 1, wherein $H_{outer\ surface}+30-H_{center}\geq 85$.

3. The golf ball of claim 1, wherein the inner core layer has an inner core interface Shore C hardness $H_{inner\ core\ interface}$ such that $-5\leq H_{inner\ core\ interface}-H_{center}\geq 5$.

4. The golf ball of claim 1, wherein $TP_1$ comprises at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

5. The golf ball of claim 1, wherein $TP_2$ comprises at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

6. The golf ball of claim 1, wherein the intermediate core layer is formed from a thermoset composition comprising at least one of natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations thereof.

7. The golf ball of claim 1, wherein the inner core layer has a diameter that is less than 1.0 inch.

8. The golf ball of claim 7, wherein the outer core layer has a thickness of greater than 0.45 inches.

* * * * *